(12) United States Patent
Riemer et al.

(10) Patent No.: US 9,055,407 B1
(45) Date of Patent: Jun. 9, 2015

(54) GENERATION AND UTILIZATION OF A DATABASE OF CELL PHONE USAGE EVENTS

(75) Inventors: Michael S. Riemer, Alrington, VA (US); Michael J. Costello, Great Falls, VA (US); Matthew J. Howard, Leesburg, VA (US)

(73) Assignee: Mykee Acquistions L.L.C., Dover, DE (US)

( * ) Notice: Subject to any disclaimer, the term of this patent is extended or adjusted under 35 U.S.C. 154(b) by 704 days.

(21) Appl. No.: 13/291,043

(22) Filed: Nov. 7, 2011

Related U.S. Application Data

(60) Provisional application No. 61/414,302, filed on Nov. 16, 2010, provisional application No. 61/467,820, filed on Mar. 25, 2011.

(51) Int. Cl.
| | |
|---|---|
| *H04W 4/02* | (2009.01) |
| *H04M 1/725* | (2006.01) |
| *G06Q 40/08* | (2012.01) |

(52) U.S. Cl.
CPC .............. *H04W 4/027* (2013.01); *G06Q 40/08* (2013.01); *H04M 1/72577* (2013.01)

(58) Field of Classification Search
CPC .......... H04M 3/2281; H04M 3/42357; H04M 2207/18; G08G 1/0962; G08G 1/20; G01C 21/26; G01C 21/3484; G06Q 50/188

USPC ........ 701/36, 200; 455/67, 557, 345; 340/525
See application file for complete search history.

(56) References Cited

U.S. PATENT DOCUMENTS

| | | | | |
|---|---|---|---|---|
| 5,266,922 A | * | 11/1993 | Smith et al. ................... | 340/525 |
| 6,502,022 B1 | * | 12/2002 | Chastain et al. ................ | 701/36 |
| 7,876,205 B2 | | 1/2011 | Catten et al. | |
| 2003/0195694 A1 | * | 10/2003 | Kozak et al. .................. | 701/200 |
| 2007/0072553 A1 | * | 3/2007 | Barbera ...................... | 455/67.11 |
| 2008/0036623 A1 | * | 2/2008 | Rosen ........................... | 340/936 |

* cited by examiner

*Primary Examiner* — Nizar Sivji
(74) *Attorney, Agent, or Firm* — Christensen O'Connor Johnson Kindness PLLC

(57) ABSTRACT

A system and program of instructions for generating and utilizing a database of driving trip data and event data to identify drivers by mobile devices during a driving trip, comprising identifying a driver, determining a driving trip based on driving trip data, identifying device usage events associated with the driver, determining a driving context for the driver based on the driving trip, the usage events and context data, filtering the usage event data associated with the portable electronic device based on the driving context to create a set of risk events that occurred during the trip, and taking some action based on the set of risk events. The usage event data includes phone calls, text and other forms of messages, emails, applications, and other usage information, including usage associated with third party sources, each of which occur during the operation of a motor vehicle during a trip.

47 Claims, 19 Drawing Sheets

| DRIVER | START TRIP | STOP TRIP | TOTAL DURATION (MINS) |
|---|---|---|---|
| MICHAEL RIEMER | 9/1/10 8:00 AM | 9/1/10 9:00 AM | 60 |
| MICHAEL RIEMER | 9/1/10 10:00 AM | 9/1/10 11:25 AM | 85 |
| MICHAEL RIEMER | 9/1/10 1:00 PM | 9/1/10 2:00 PM | 60 |
| MICHAEL RIEMER | 9/1/10 4:30 PM | 9/1/10 5:00 PM | 30 |
| MICHAEL RIEMER | 9/2/10 8:00 AM | 9/2/10 8:45 PM | 45 |
| MICHAEL RIEMER | 9/2/10 10:00 AM | 9/2/10 11:15 AM | 75 |
| MICHAEL RIEMER | 9/2/10 1:00 PM | 9/2/10 2:00 PM | 60 |
| MICHAEL RIEMER | 9/2/10 3:00 PM | 9/2/10 3:30 PM | 30 |
| MICHAEL RIEMER | 9/2/10 6:00 PM | 9/2/10 6:20 PM | 20 |
| MICHAEL RIEMER | 9/3/10 7:00 AM | 9/3/10 7:45 AM | 45 |
| MICHAEL RIEMER | 9/3/10 10:00 AM | 9/3/10 10:25 PM | 25 |
| MICHAEL RIEMER | 9/3/10 12:00 PM | 9/3/10 1:00 PM | 60 |
| MICHAEL RIEMER | 9/3/10 4:00 PM | 9/3/10 5:00 PM | 60 |

FIG. 1B

| EVENT TYPE | TIME/DATE | DUR. MINS | LOCATION | SPEED (MPH) | SUN LIGHT | WEATHER | TRAFFIC |
|---|---|---|---|---|---|---|---|
| CALL MADE | 9/1/10 7:00 AM | 5 | X/Y | 30 | DARK | LIGHT RAIN | LIGHT |
| SMS SENT | 9/1/10 | - | X/Y | 40 | LIGHT | CLOUDY | HEAVY |
| CALL RECEIVED | 9/1/10 1:00 PM | 9 | X/Y | 55 | LIGHT | PARTLY SUNNY | MODERATE |
| SMS RECEIVED | 9/1/10 7:30 PM | - | X/Y | 60 | DUSK | THUNDER-STORMS | LIGHT |
| SMS SENT | 9/2/10 8:00 AM | - | X/Y | 25 | LIGHT | SNOW FLURRIES | LIGHT |
| SMS RESPONDED | 9/2/10 10:00 AM | - | X/Y | 35 | LIGHT | CLEAR | HEAVY |
| CALL MADE | 9/2/10 1:00 AM | 2 | X/Y | 30 | LIGHT | CLEAR | LIGHT |
| SMS RECEIVED | 9/2/10 3:00 PM | 4 | X/Y | 55 | LIGHT | CLEAR | MODERATE |
| SMS RECEIVED | 9/2/10 8:00 PM | 4 | X/Y | 55 | DARK | SNOW FLURRIES | MODERATE |
| SMS SENT | 9/3/10 7:00 AM | - | X/Y | 20 | DARK | SNOW SQUALLS | MODERATE |
| SMS RECEIVED | 9/3/10 10:00 AM | - | X/Y | 35 | LIGHT | CLEAR | - |
| CALL RECEIVED | 9/3/10 12:00 PM | 8 | X/Y | 30 | LIGHT | HEAVY RAIN | - |
| SMS RECEIVED | 9/3/10 4:00 PM | - | X/Y | 25 | LIGHT | CLEAR | - |

FIG. 3

| USER NAME | USER PHONE # | TOTAL TRIPS | TOTAL AVG MILEAGE PER TRIP | TOTAL MILEAGE | TOTAL DURATION OF TRIPS (MINS) | CALLS MADE | AVERAGE CALL DURATION (MINS) | TOTAL CALL DURATION (MINS) | SMS SENT | SMS RECEIVED | SMS RESPONDED | DATA USAGE (MINS) |
|---|---|---|---|---|---|---|---|---|---|---|---|---|
| MICHAEL RIEMER | 703-906-3544 | 80 | 35.00 | 2800.00 | 4800.00 | 100 | 1 | 160 | 160 | 400 | 80 | 0 |
| BOB SMITH | 703-666-2345 | 95 | 49.58 | 4710.42 | 8075.00 | 25 | 5 | 675 | 380 | 760 | 285 | 0 |
| FRED JONES | 703-729-0099 | 40 | 35.00 | 1400.00 | 2400.00 | 100 | 7 | 1239 | 80 | 200 | 80 | 0 |
| JOYCE WALKER | 703-297-0865 | 104 | 17.50 | 1820.00 | 3120.00 | 49 | 8 | 1192 | 104 | 624 | 104 | 0 |
| MARY POPPLER | 703-906-3548 | 35 | 26.25 | 918.75 | 1575.00 | 15 | 3 | 210 | 140 | 175 | 70 | 0 |
| SAM BURGER | 703-906-3549 | 66 | 37.50 | 2475.00 | 4242.86 | 18 | 9 | 1152 | 198 | 198 | 198 | 0 |
| TERRY WOODS | 703-234-5672 | 88 | 35.00 | 3080.00 | 5280.00 | 68 | 3 | 546 | 264 | 440 | 264 | 0 |
| JIM PAGINO | 703-999-0011 | 20 | 17.50 | 350.00 | 600.00 | 42 | 2 | 264 | 100 | 100 | 100 | 0 |
| PAUL BLITTER | 703-987-2243 | 45 | 11.67 | 525.00 | 900.00 | 33 | 5 | 555 | 90 | 360 | 90 | 0 |
| MIKE CONTELLO | 703-906-3553 | 70 | 26.25 | 1837.50 | 3150.00 | 59 | 4 | 632 | 280 | 280 | 140 | 0 |
| MATT HUGHS | 703-906-3554 | 65 | 14.58 | 947.92 | 1625.00 | 60 | 6 | 756 | 65 | 130 | 65 | 0 |
| ELEANOR JOHNSON | 703-763-9090 | 43 | 35.00 | 1505.00 | 2580.00 | 32 | 5 | 385 | 172 | 129 | 129 | 0 |
| MARK THOMAS | 703-210-6111 | 22 | 35.00 | 770.00 | 1320.00 | 12 | 9 | 466 | 176 | 110 | 120 | 0 |

FIG. 4

| PHONE CDR'S | | | | | |
|---|---|---|---|---|---|
| USER NAME | USER PHONE # | EVENT | START | STOP | DURATION (MINS) |
| MICHAEL RIEMER | 703-906-3544 | OUTBOUND CALL | 9/1/10 8:00 AM | 9/1/10 8:02 AM | 2 |
| MICHAEL RIEMER | 703-906-3545 | INBOUND CALL | 9/1/10 10:00 AM | 9/1/10 10:12 AM | 12 |
| MICHAEL RIEMER | 703-906-3546 | OUTBOUND CALL | 9/1/10 1:10 PM | 9/1/10 1:12 PM | 2 |
| MICHAEL RIEMER | 703-906-3547 | OUTBOUND CALL | 9/1/10 4:30 PM | 9/1/10 4:35 PM | 5 |
| MICHAEL RIEMER | 703-906-3548 | OUTBOUND CALL | 9/2/10 9:12 AM | 9/2/10 9:22 PM | 10 |
| MICHAEL RIEMER | 703-906-3549 | INBOUND CALL | 9/2/10 10:00 AM | 9/2/10 10:01 PM | 1 |
| MICHAEL RIEMER | 703-906-3550 | INBOUND CALL | 9/2/10 1:23 PM | 9/2/10 1:25 PM | 2 |
| MICHAEL RIEMER | 703-906-3551 | INBOUND CALL | 9/2/10 3:12 PM | 9/2/10 3:16 AM | 4 |
| MICHAEL RIEMER | 703-906-3552 | OUTBOUND CALL | 9/2/10 6:00 PM | 9/2/10 6:08 AM | 8 |
| MICHAEL RIEMER | 703-906-3553 | OUTBOUND CALL | 9/3/10 7:05 AM | 9/3/10 7:09 AM | 4 |
| MICHAEL RIEMER | 703-906-3554 | OUTBOUND CALL | 9/3/10 10:00 AM | 9/3/10 10:25 AM | 25 |
| MICHAEL RIEMER | 703-906-3555 | INBOUND CALL | 9/3/10 12:00PM | 9/3/10 12:06 AM | 6 |
| MICHAEL RIEMER | 703-906-3556 | OUTBOUND CALL | 9/3/10 4:00 PM | 9/3/10 4:07 AM | 7 |

FIG. 6A

| USER NAME | USER PHONE # | EVENT | TIME/DATE |
|---|---|---|---|
| MICHAEL RIEMER | 703-906-3544 | SMS SENT | 9/1/10 8:00 AM |
| MICHAEL RIEMER | 703-906-3545 | SMS RECEIVED | 9/1/10 10:00 AM |
| MICHAEL RIEMER | 703-906-3546 | SMS SENT | 9/1/10 1:00 PM |
| MICHAEL RIEMER | 703-906-3547 | SMS RECEIVED | 9/1/10 4:30 PM |
| MICHAEL RIEMER | 703-906-3548 | SMS SENT | 9/2/10 8:00 AM |
| MICHAEL RIEMER | 703-906-3549 | SMS SENT | 9/2/10 10:00 AM |
| MICHAEL RIEMER | 703-906-3550 | SMS RECEIVED | 9/2/10 1:00 PM |
| MICHAEL RIEMER | 703-906-3551 | SMS SENT | 9/2/10 3:00 PM |
| MICHAEL RIEMER | 703-906-3552 | SMS RECEIVED | 9/2/10 6:00 PM |
| MICHAEL RIEMER | 703-906-3553 | SMS SENT | 9/3/10 7:00 AM |
| MICHAEL RIEMER | 703-906-3554 | SMS RECEIVED | 9/3/10 10:00 AM |
| MICHAEL RIEMER | 703-906-3555 | SMS SENT | 9/3/10 12:00PM |
| MICHAEL RIEMER | 703-9906-3556 | SMS SENT | 9/3/10 4:00 PM |

| EMAIL EVENTS | | | |
|---|---|---|---|
| USER NAME | USER PHONE # | EVENT | TIME/DATE |
| MICHAEL RIEMER | 703-906-3544 | EMAIL SENT | 9/1/10 8:00 AM |
| MICHAEL RIEMER | 703-906-3545 | EMAIL RECEIVED | 9/1/10 10:00 AM |
| MICHAEL RIEMER | 703-906-3546 | EMAIL SENT | 9/1/10 1:00 PM |
| MICHAEL RIEMER | 703-906-3547 | EMAIL RECEIVED | 9/1/10 4:30 PM |
| MICHAEL RIEMER | 703-906-3548 | EMAIL SENT | 9/2/10 8:00 AM |
| MICHAEL RIEMER | 703-906-3549 | EMAIL SENT | 9/2/10 10:00 AM |
| MICHAEL RIEMER | 703-906-3550 | EMAIL RECEIVED | 9/2/10 1:00 PM |
| MICHAEL RIEMER | 703-906-3551 | EMAIL SENT | 9/2/10 3:00 PM |
| MICHAEL RIEMER | 703-906-3552 | EMAIL RECEIVED | 9/2/10 6:00 PM |
| MICHAEL RIEMER | 703-906-3553 | EMAIL SENT | 9/3/10 7:00 AM |
| MICHAEL RIEMER | 703-906-3554 | EMAIL RECEIVED | 9/3/10 10:00 AM |
| MICHAEL RIEMER | 703-906-3555 | EMAIL SENT | 9/3/10 12:00PM |
| MICHAEL RIEMER | 703-9906-3556 | EMAIL SENT | 9/3/10 4:00 PM |

FIG. 6B

| USER NAME | START TRIP | STOP TRIP | TOTAL DURATION (MINS) | TOTAL MILEAGE |
|---|---|---|---|---|
| MICHAEL RIEMER | 9/1/10 8:00 AM | 9/1/10 9:00 AM | 60 | 35.00 |
| MICHAEL RIEMER | 9/1/10 10:00 AM | 9/1/10 11:25 AM | 85 | 49.58 |
| MICHAEL RIEMER | 9/1/10 1:00 PM | 9/1/10 2:00 PM | 60 | 35.00 |
| MICHAEL RIEMER | 9/1/10 4:30 PM | 9/1/10 5:00 PM | 30 | 17.50 |
| MICHAEL RIEMER | 9/2/10 8:00 AM | 9/2/10 8:45 AM | 45 | 26.25 |
| MICHAEL RIEMER | 9/2/10 10:00 AM | 9/2/10 11:15 AM | 75 | 37.50 |
| MICHAEL RIEMER | 9/2/10 1:00 PM | 9/2/10 2:00 PM | 60 | 35.00 |
| MICHAEL RIEMER | 9/2/10 3:00 PM | 9/2/10 3:30 PM | 30 | 17.50 |
| MICHAEL RIEMER | 9/2/10 6:00 PM | 9/2/10 6:20 PM | 20 | 11.67 |
| MICHAEL RIEMER | 9/3/10 7:00 AM | 9/3/10 7:45 AM | 45 | 26.25 |
| MICHAEL RIEMER | 9/3/10 10:00 AM | 9/3/10 10:25 AM | 25 | 14.58 |
| MICHAEL RIEMER | 9/3/10 12:00PM | 9/3/10 1:00PM | 60 | 35.00 |
| MICHAEL RIEMER | 9/3/10 4:00 PM | 9/3/10 5:00 PM | 60 | 35.00 |

| USER | EVENT | TIME/DATE | LOCATION | SPEED | WEATHER | TRAFFIC | POSTED SPEED | DAY LIGHT |
|---|---|---|---|---|---|---|---|---|
| MICHAEL RIEMER | START TRIP | 9/1/10 9:00 AM | X/Y | 0.00 | | | | |
| MICHAEL RIEMER | LOCATION | 9/2/10 9:01 AM | X/Y | 25.00 | | | | |
| MICHAEL RIEMER | LOCATION | 9/3/10 9:02 PM | X/Y | 35.00 | | | | |
| MICHAEL RIEMER | LOCATION | 9/4/10 9:03 PM | X/Y | 55.00 | | | | |
| MICHAEL RIEMER | LOCATION | 9/5/10 9:04 AM | X/Y | 55.00 | | | | |
| MICHAEL RIEMER | LOCATION | 9/6/10 9:05 AM | X/Y | 55.00 | | | | |
| MICHAEL RIEMER | LOCATION | 9/7/10 9:06 PM | X/Y | 55.00 | | | | |
| MICHAEL RIEMER | LOCATION | 9/8/10 9:07 PM | X/Y | 35.00 | | | | |
| MICHAEL RIEMER | LOCATION | 9/9/10 9:08 PM | X/Y | 25.00 | | | | |
| MICHAEL RIEMER | STOP TRIP | 9/10/10 9:09 AM | X/Y | 0.00 | | | | |

FIG. 7

| CALLS MADE | | CALLS RECEIVED | | DURATION (MINS) | | SMS RECEIVED | | SMS SENT | | SMS RESPONDED | |
|---|---|---|---|---|---|---|---|---|---|---|---|
| A | 0 | A | 1 | A | <.5 | A | 1 | A | 0 | A | 0 |
| B | 1 | B | 2 | B | <1 | B | 3 | B | 2 | B | 1.5 |
| C | 2 | C | 3 | C | <2 | C | 5 | C | 3 | C | 2 |
| D | 3 | D | 4 | D | <3 | D | 7 | D | 4 | D | 2.5 |
| F | 4+ | F | 5+ | F | >3 | F | >7 | F | >4 | F | >2.5 |

| | |
|---|---|
| A | 4 |
| B | 3 |
| C | 2 |
| D | 1 |
| F | 0 |

| PER TRIP | AVERAGE | |
|---|---|---|
| CALLS MADE | 0.793014 | 3.5 A- |
| CALLS RECEIVED | 1.350582 | 3.5 A- |
| CALL DURATION (MIN) | 4.969221 | 0 F |
| SMS RECEIVED | 5.05304 | 2 D |
| SMS SENT | 2.857697 | 2 C |
| SMS RESPONDED | 2.218629 | 1 D |
| | | 2 C |

| PER TRIP | AVERAGE | WORSE | BEST |
|---|---|---|---|
| CALLS MADE | 0.793014 | 10 | 1 |
| CALLS RECEIVED | 1.350582 | 10 | 1 |
| CALL DURATION (MIN) | 4.969221 | 22 | 0.5 |
| SMS RECEIVED | 5.05304 | 30 | 1 |
| SMS SENT | 2.857697 | 10 | 0 |
| SMS RESPONDED | 2.218629 | 4 | 0 |

FIG. 9

GENERATION AND UTILIZATION OF A DATABASE OF CELL PHONE USAGE EVENTS

CROSS-REFERENCES TO RELATED APPLICATIONS

This application is a non-provisional application that takes priority from U.S. Provisional Patent Application 61/414,302, filed 16 Nov. 2010, and U.S. Provisional Patent Application 61/467,820, filed 25 Mar. 2011.

BRIEF DESCRIPTION

A system and program storage device readable by one or more machines, tangibly embodying a program of instructions executable by the machines to perform program steps generating and utilizing a database of driving trip data and event data to identify when a driver could be distracted by a portable electronic device used by the driver under specified circumstances. The system and programs steps comprising identifying a driver, determining a driving trip based on driving trip data, identifying device usage events associated with the driver, determining a driving context for the driver based on the driving trip, the usage events and context data, filtering the usage event data associated with the portable electronic device based on the driving context to create a set of risk events that occurred during the trip, and taking some action based on the set of risk events. The event data includes phone calls, text and other forms of messages, emails, applications, and other usage information, including usage associated with third party sources, each of which occur during the operation of a motor vehicle during a trip.

STATEMENTS AS TO THE RIGHTS TO INVENTIONS MADE UNDER FEDERALLY SPONSORED RESEARCH OR DEVELOPMENT

Not applicable.

REFERENCE TO A "SEQUENCE LISTING," A TABLE, OR A COMPUTER PROGRAM LISTING APPENDIX SUBMITTED ON A COMPACT DISK

Not applicable.

BRIEF DESCRIPTION OF THE SEVERAL VIEWS OF THE DRAWING

FIG. 1B illustrates a driving context for a driver for trips in accordance with an embodiment;

FIG. 3 illustrates a listing of usage data associated with other data relevant to a determination of risk events in accordance with an embodiment;

FIG. 4 illustrates aggregated data for a plurality of drivers presented in a tabular format in accordance with an embodiment;

FIGS. 6A and 6B illustrate sample call detail records and log events for a driver in accordance with an embodiment;

FIG. 7 illustrates trip information for a driver presented in a tabular format in accordance with an embodiment;

FIG. 9 illustrates a scoring methodology for cell phone usage events in accordance with an embodiment;

DETAILED DESCRIPTION

Figure 1A:
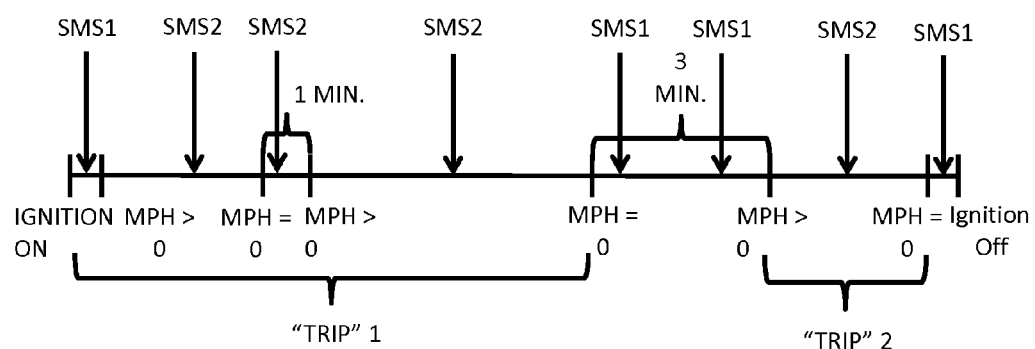
FIG. 1A is an illustration of a timeline defining a trip in accordance with an embodiment.

A system and program storage device readable by one or more machines, tangibly embodying a program of instructions executable by the machines to perform program steps (the "program") generating and utilizing a database of driving trip data and event data to identify when a driver could be distracted by a portable electronic device (which includes any type of smart phone or other type of communication device that combines phone communication with any other type of function) used by the driver under specified circumstances. The system and programs steps (carried out alone or in combination within a carrier network, within a cloud-based computing environment, behind a company firewall on a computer, on a server in a shared data center, or on a PC or mobile device) comprising identifying a driver, determining a driving trip, identifying device usage events, determining a driving context for the driver based on the driving trip, context data and the usage event, filtering the usage event data based on the driving context to create a set of risk events that occurred during the trip or scoring the usage events based on risk factors, and taking some action based on the set of risk events or risk score. The event data includes phone calls (sent, received, responded to and duration), text and other forms (SMS, MMS, etc.) of messages (sent, received, and responded to), emails (sent, received and responded to), applications (accessed, used, duration, etc), and other usage information, including usage associated with third party sources (web, social media, etc.), each of which occur during the operation of a motor (hydrocarbon, electric, hybrid, etc.) vehicle (car, truck, train, metro, heavy equipment, etc) during a trip.

Identifying the Driver, the Trip and the Driving Context

Drivers can be identified to the system and program in a variety of ways. Identifying a driver, a group of drivers, or an entire enterprise of drivers can be done via a driver's name, cell phone number, the Internet address associated with a mobile device, vehicle ID, driver ID, or other such identifier associated with such driver whether such information comes from electronic or paper systems across various data sources. A driver can be part of a single organization and/or part of one or more departments/functional areas within an organization.

Data regarding a driver, groups of drivers or an entire enterprise of drivers, can be entered manually through a PC/Web interface and/or via an electronic document (e.g. Excel spreadsheet) or through an interface to one or more Cloud/Server/PC/Web/Mobile based applications. Furthermore, data regarding drivers, groups of drivers or an entire enterprise of drivers may also be categorized by role, title, department or other attributes relating to an organization or functional area within an organization. For example, an administrator can view cell phone usage data for one department, or may alternatively view and compare data from a plurality of departments.

The identification of a driver within the context of a third party telematics/GPS/Fleet management provider can be done automatically or manually and can be based on the driver's relationship to a specific vehicle and a specific phone number, the identification of the driver from a $3^{rd}$ party application (such as a dispatch application), the identification of the driver via a key fob, RFID or other near field communication method, data entry into an application directly on the phone or third party mobile data terminal or tablet, etc.

Once the driver or drivers are identified, the driving context needs to be established, based on a driving trip and other data. The driving context of a single user of a single vehicle (i.e., the driver of that vehicle), a group of users (multiple different drivers each associated with a different vehicle), a group of drivers associated with a single vehicle, or an entire enterprise of users (a fleet of drivers each associated with one or more vehicles), can be determined from a variety of context data sources. Since the driving context is based on a driving trip, which is derived from telematics data, it is necessary to explain how a trip is generally defined before further defining the driving context.

In general, a trip, from a telematics perspective is defined as any time between the start and stop of a vehicle (typically ignition on and ignition off), although different telematics providers determine a trip differently. For example, some providers define a trip as ignition on to ignition off, which other providers define a trip as movement greater than zero to movement equal to zero. Some telematics providers also include some delay after movement/MPH equals zero so as to eliminate certain types of stops, such as stops at stop lights or train crossings.

In an embodiment, a single standard is adopted for defining a trip, i.e., movement greater than zero to movement equal to zero plus some delay. In addition, the standard includes common definitions for trip elements and events generated by a telematics provider that need to be stored for future reference. In the embodiment, the user of the system and program has the ability to define the length of the delay based on what is appropriate for the user. If a user's drivers frequently make stops of less than five minutes, then an appropriate delay might be five minutes, whereas other types of drivers might require longer or shorter delays. As for defining events to record, different standards could be adopted, such as not counting events occurring during stops that are longer than the idle delay. Naturally, exceptions could also be created, such as counting events that occur between ignition on and first movement or between ignition off and last movement equal to zero.

With reference to FIG. 1A, an embodiment is illustrated that defines a trip as something less than ignition on to ignition off and defines an idle delay as two minutes. In the timeline depicted in FIG. 1A, defined by the starting point of "ignition on" to the stopping point of "ignition off", a number of "potential" events are noted as well as a number of trip elements, which result in the definition of two separate trips and a stop in excess of the idle delay. The SMS records identified as "SMS1" would not be counted as events because they occur before or after movement equals zero, including a stop in excess of the idle delay, and are therefore outside of the definition of "Trip 1" and "Trip 2". On the other hand, SMS records identified as "SMS2" would be counted as events because they occur during Trip 1 and Trip 2, including the one-minute-long stop that is less than the two minute idle delay.

Once a trip has been defined, it becomes possible to define the driving context, which is characterized by a specific time and date of a driving trip, with the time and date representative of each trip, as well as other data that provides context for the trip. FIG. 1B illustrates a simplified embodiment of the driving context for a specific driver based on driving trip data that includes the driver's name, the start and stop time of each trip taken by the driver, and the total duration and total miles traveled of each trip. The driving context for a driver can be stored in a file or database. As will be further described below, embodiments provide users of the system/program (also referred to as administrators in some contexts herein) with a secure interface to the data store or database, allowing one or more users access to cell phone usage data for a driver or for a plurality of drivers.

Figure 1C:
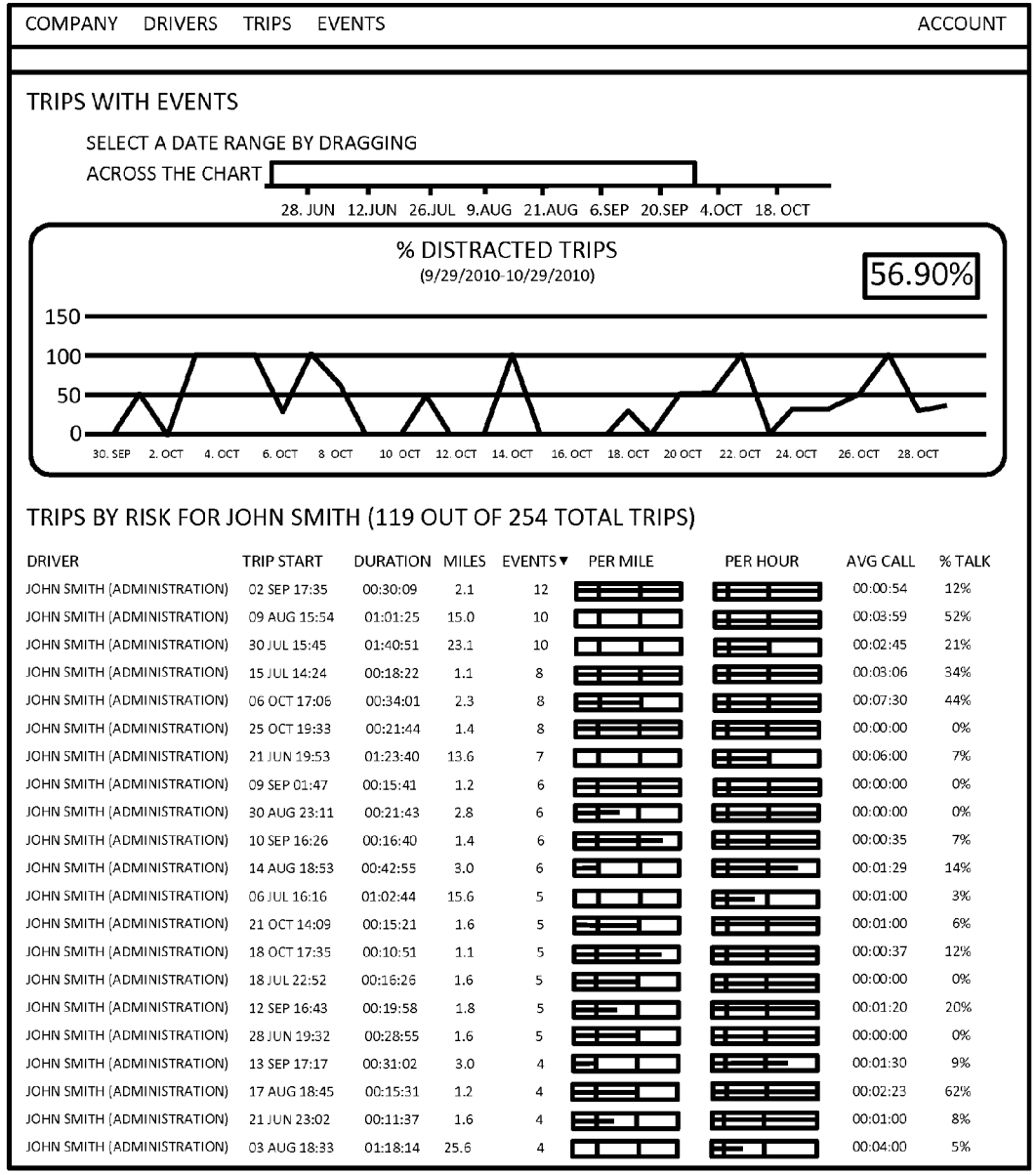
FIG. 1C illustrates a driving context for a driver for trips in accordance with an embodiment.

In an embodiment, the interface to the database can present to the user the driving context for the one or more drivers. The interface to the database can enable the user to select a subset of the entire driving context for a specific driver. For example, the driving context can be displayed for a specific date, for a range of dates, for a specific time, for a range of times, for a single driver, or for one or more drivers. FIG. 1C illustrates an embodiment of the driving context for a single driver that includes trip data and a range of contextual data, including the driver's name, the trip start time, the duration of the trip, and the miles driven. FIG. 1C also includes cell phone usage events, the events per mile driven and per hour, the average length of each event, such as a phone call, and the percentage of time spent by the driver talking. The trips and other metrics can be illustrated in a variety of ways, such as some of those illustrated in FIG. 1C, and as further described below.

The driving context can be determined in various ways and can include various types of contextual data. In one embodiment, the driving context is determined using one or more electronic data sources (e.g. telematics service providers) that characterize the operation, location, movement, or other attributes of a driver operating a motor vehicle, plus additional contextual data sources, as further described below. The operation movement can include driver actions that are considered risk factors, such as hard braking, fast acceleration, swerves, speeding and other driving behaviors known to be a risk factor for a potential crash. In yet another embodiment, the driving context can be determined using one or more manually entered data sets based on handwritten, typed, electronically clocked, or other input method which characterizes the operation of a motor vehicle, but which is not in a format which can be directly linked, integrated or uploaded directly into an application. For example, data from a device installed/integrated in a vehicle (black box or OBDII or OEM installed or JBus), which uses GPRS, CDMA or other type of wireless communication radio to communicate such information back to an application or an intermediary application, can then be used by that application. Likewise, data from a device installed/integrated in a vehicle (black box or OBDII or OEM installed or JBus), from which data is captured locally via a USB cable or some other non-wireless technique or via a wireless protocol (Bluetooth, Wifi, Zigbee, etc.) to an intermediary device (phone, hot spot, etc.), can then be uploaded into the application. Any of this data can then be used to help determine the driving context.

Context data can also include data from the mobile device based on an API from the device (OS, platform or other application on the device); data from a mobile handset application which provides information regarding the movement, speed and location of the driver based on cell site ID, RSSI reading, a local location service, an alternative positioning application or GPS service or other information from a handset where such information can be associated with a specific time and date associated with such driver; data from a Cloud/web/PC/server-based application which characterizes the driver in a way from which operation of a motor vehicle can be determined (e.g. a dispatch application that records the start of a trip based on a communication with a driver and the arrival time as captured in the dispatch application); data from a mobile application which characterizes the driver in a way from which operation of a motor vehicle can be determined; and data manually entered into an application based on paper documents (e.g. trip sheets) or other information. Regardless of the source and/or type of data ultimately stored in the data store 204, all such data is stored in such a way as to link a particular vehicle with a particular driver with a particular mobile device so that the data can be analyzed pursuant to the driving context.

Architecture and Process Flow

Figure 2A:
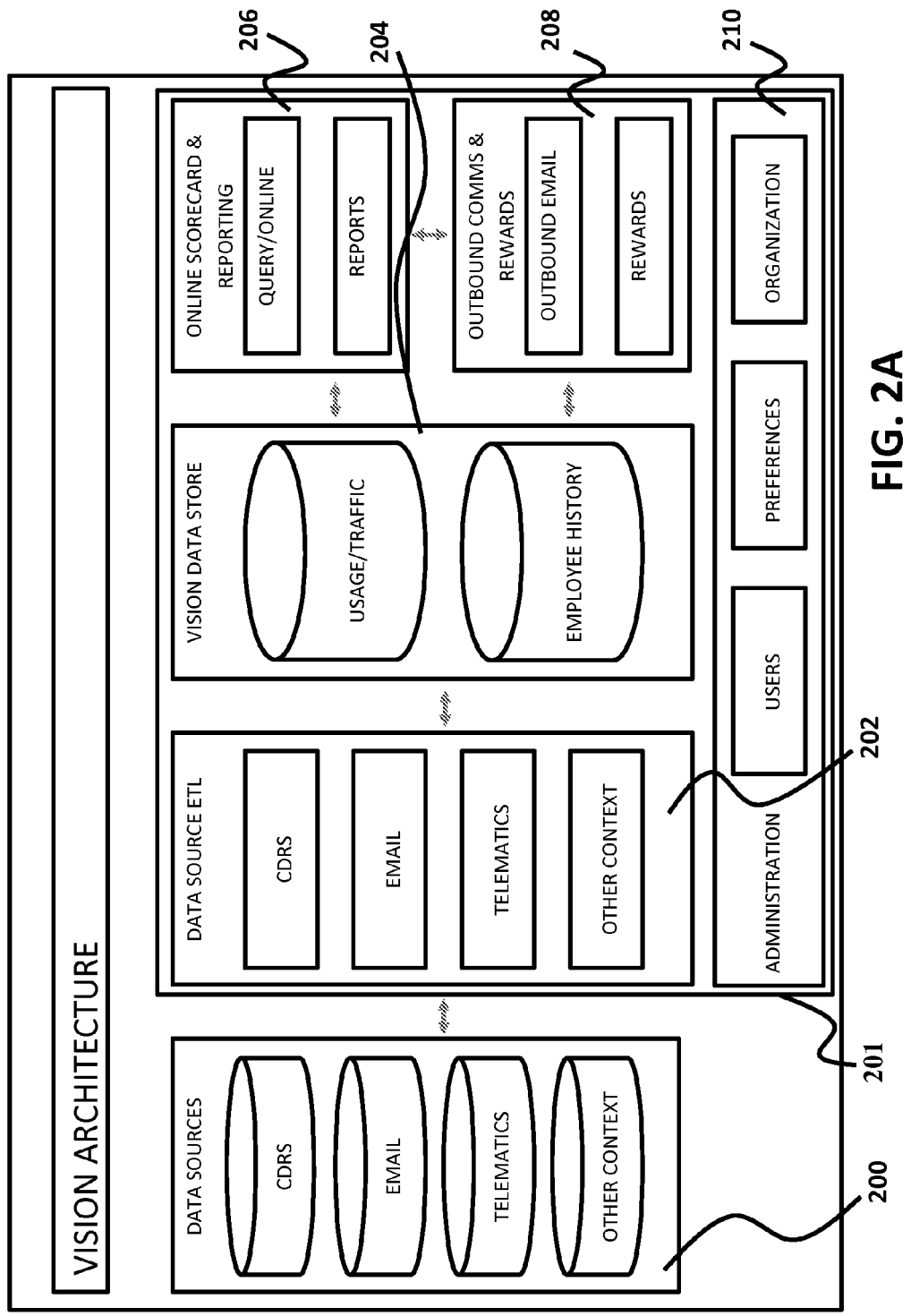
FIG. 2A illustrates of the overall architecture of the system including a computerized system and data sources in accordance with an embodiment.

The overall architecture of the system and program of instructions is illustrated by FIG. 2A, where a plurality of data sources 200 are input to a computerized system 201 that includes the program of instructions. The computerized system 201 includes a processor, memory and a variety of input/output ports and systems for communicating with the processor and memory and numerous different peripheral devices and systems, such as communication networks, external servers and databases, email system, the World Wide Web, display systems, etc. As illustrated in FIG. 2A, within the computerized system 201 are a variety of functional components that are performed by different combinations of one or more processors, memories (databases), other devices, and the program of instructions.

For example, the data source ETL 202 receives data from the data sources 200 through an input and processes the data to extract, transform and load (ETL) that data into the data store 204. The ETL process enables data from a variety of data sources 200, such as the call data records (CDRs) from numerous telecommunication service providers, to be converted into one or more common formats for storage and analytical use by the system/program 201. The data sources 200 include context data such as CDRs, email and text message detail records, telematics data, application records from either applications operating on a mobile device or accessed by the mobile device over the Internet or other networks, and environmental data associated with the vehicle during a driving trip, such as road maps, traffic data, speed limit data, school zone data, construction zone data, and a wide variety of other potentially relevant data. Once transformed, this data is stored in the data store 204 with other potentially relevant data, such as information about the driver(s), that can be used for reporting purposes and as well as determining when a usage event corresponds to a risk event.

The online scorecard and reporting function 206 performs additional analytical functions, described below in much greater detail, including the analysis of the data stored in the data store 204, and various actions that can be taken as a result of the analyzed data, such as providing reports, displays and other resultant data through at least a display interface that is part of the system/program 201. The visual formats for a display include graphic formats, map formats, report formats, including tables, etc. Reports generated by the analysis function 206 can also be communicated 208 in some appropriate manner, which might include the generation of rewards (or other) and email or other forms of communication to the necessary parties that are representative of the various actions that can be taken responsive to the analysis. The administration function 210 identifies and authorizes users, processes and records user preferences and includes necessary organizational data associated with the user.

Figure 2B:
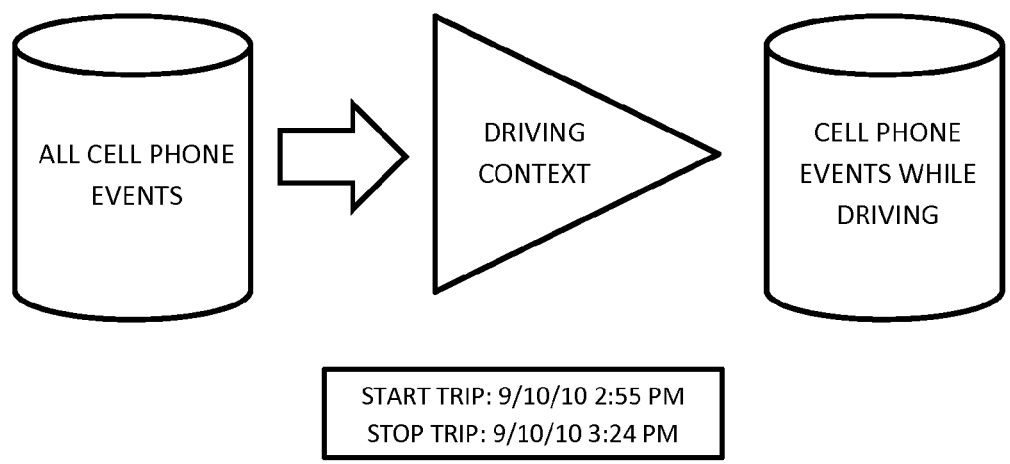
FIG. 2B illustrates how mobile device events are input from data sources.

FIG. 2B provides a simplified example of how mobile device events 200, such as cell phone events, are input from one or more data sources, ETL processed 202, and analyzed by the analysis section 206, based on a driving context defined by a trip, to determine which of the events occurred while the driving was driving during a trip. In an embodiment, the analysis 206 filters through the cell phone events and discards cell phone events that did not occur during a trip and reports those that did.

Figure 2C:
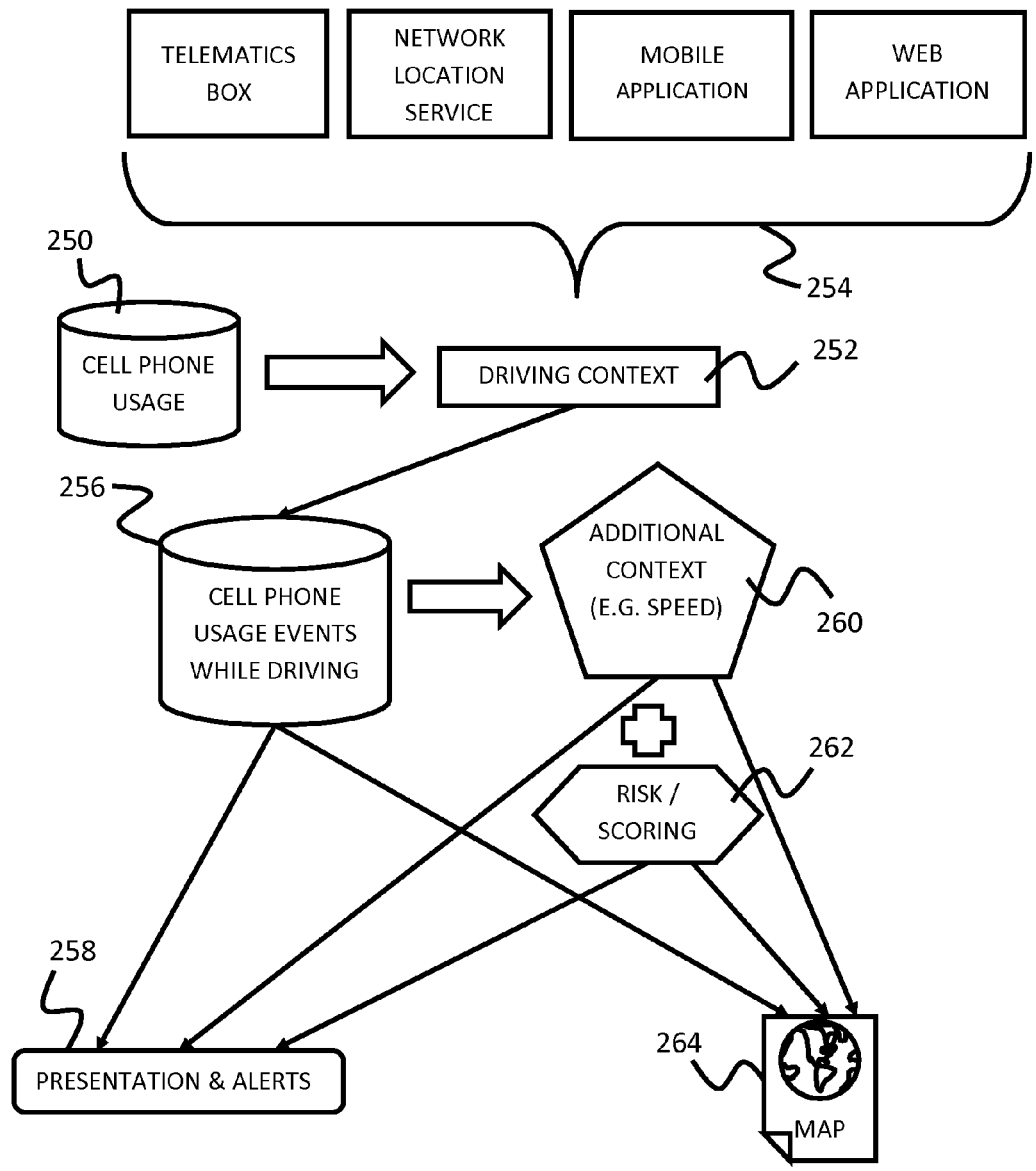
FIG. 2C illustrates the architecture and process flow of the system in accordance with an embodiment.

Another way of understanding the architecture and process flow of the system/program is illustrated in FIG. 2C, which illustrates a high level process overview in accordance with an embodiment. Cell phone usage events 250 of a cell phone are filtered based on the driving context 252 of the driver to create a set of events that were performed or occurred during a driving trip. The driving context 252 is defined from various sources 254, including a telematics box, a network location service, a mobile application, a web application, etc. Triggers can be associated with various cell phone usage events 256 that occur during a driving trip (referenced as "while driving" in the context of FIG. 2C), with alerts 258 presented or sent to one or more recipients when a trigger condition is met. The cell phone usage events can also be collected for a single driver, or aggregated for a plurality of drivers, and presented 258 via the display interface. The presentation of data can be done using tables, graphs, and other visual formats, as further discussed below. Additional context information 260, such as speed, is used to enhance the presentation of the cell phone usage data and to provide further information on alerts. Cell phone usage events can also be scored 262 based on the events performed by the driver while driving. The risk score 262 can be presented 258 with the cell phone usage data. Cell phone usage events, combined with the additional context information and the risk/scoring of events can also be presented on a map 264.

The cell phone usage data can be accessible or presented 258 to one or more administrators, such as parents, employers, rental car companies, drivers, etc., via a website, a web/server-based application, an RSS feed, a PC application, or a mobile application (from herein "display interface"). Embodiments enable the one or more administrators to view cell phone usage data for a single driver, a group of drivers or an entire enterprise of drivers in the context of operating a motor vehicle during specific time and date intervals. For example, a manager in a company or enterprise would be able to view and keep track of cell phone usage data for employees using cell phones issued by the company or enterprise or owned by the end user. A rental car company can monitor cell phone usage by a renter, such that if the renter had agreed to pay a lower rate based on promising not to use their cell phone, the renter could be charged a penalty or a higher rate when the vehicle was returned based on the confirmed cell phone usage. The display interface can also enable access to cell phone usage data to a group of users or an enterprise of users. The display interface can include access levels, with the amount and type of cell phone usage data displayed based on the access level of the current user/administrator. For example, each user that is an employee can have access to cell phone usage data associated with their assigned cell phone. However, a user that is a manager or administrator can have a higher access level, enabling the manager to view and access cell phone usage data for a plurality of drivers. In alternative embodiments, personal cell phone usage data can be accessible to an individual user.

Usage Events, Filtering, Presentation and Actions

As noted above, mobile phone/cell phone usage events are represented by a combination of different types of data that is then filtered based on the driving context, and perhaps other preferences, to determine if certain usage events represent risk events. FIG. 3 illustrates a listing of usage data that is associated with other data that may be relevant to a determination as to whether such usage events represent risk events. The tabular format of FIG. 3 is an embodiment of how such data could be presented or displayed to a user through a display interface of the system/program. The usage data shown in FIG. 3 includes the event type, such as a call made, a call received, a SMS sent, received or responded to, the time and date of the event and the duration of the event. This event data is then combined with the event location (which could also include descriptors associated with the event location, such as whether the location is within a construction zone or school zone or near a railroad crossing), the driving speed of the driver while the event occurred (which could also include the posted speed limit), the sun light conditions, the weather conditions, and the traffic conditions. Embodiments can also enable the user to select the attributes the user is interested in, such as by including additional attributes and excluding others. For example, a user may not be interested in the sun light and weather conditions, but may be interested in seeing the total distance covered over the trip.

Embodiments are not limited to the cell phone usage data categories illustrated in FIG. 3. For example, an alternative embodiment may record the number of temporary stops over the duration of a driving trip. As part of defining what constitutes a trip, as illustrated with regard to FIG. 1A, the user could define what constitutes a temporary stop based on the nature of the trips taken by the driver. For example, a temporary stop for a package delivery service driver could be less than five minutes, while a furniture delivery driver could be less than twenty minutes.

As noted above, the other data associated with usage data can be collected from a wide variety of sources. The additional information can be exact, extrapolated or estimated based on time and date relationships to one or more cell phone usage events, and can include data related to distance/mileage, location, school zones, construction zones and other areas of interest, as well as speed, posted speed limit, day light, type of road (e.g. straight, curvy, etc.), weather, traffic, or any other characteristics which may impact the safety of a driver operating a motor vehicle.

Embodiments of the display interface can present cell phone usage data in various ways. In a particular embodiment the cell phone usage data is presented for each cell phone usage event, including phone calls (sent, received and duration of the phone call), text messages (sent, received and responded), emails, instant messages, status updates to a social networking site, postings to a website, or the sending of messages via a social networking site or via the messaging system provided by a website.

Cell phone usage events can also be presented via the display interface by aggregating various usage events or aggregating the data for two or more drivers. Data can be aggregated by presenting cell phone usage data in terms of the mean, median, and average of cell phone usage events for a single driver, for a group of drivers, or for an entire enterprise of drivers. For example, the cell phone usage data can be aggregated for each event for a single driver over a period of time. This would enable data for driver A to be aggregated for the received calls and the placed calls events over an entire day, over an entire week, etc. Data can also be aggregated across a group of drivers. For instance, a manager can aggregate data a group of employees for a number of events over a period of time.

Cell phone usage data for a single driver, a group of drivers or an entire enterprise of drivers in the context of operating a motor vehicle during specific time and date intervals can be presented via the display interface using a table (as shown in FIG. 3), a graphic, or some other visual format. The cell phone usage data can be accessible to one or more administrators, a driver, a group of drivers or an entire enterprise of drivers. Alternatively, each event can be presented in a table, graphic or other visual format depicting information about a driver or group of drivers. FIG. 4 illustrates aggregated data for a plurality of drivers presented in a different tabular format, while FIG. 5 presents aggregated data for a plurality of drivers in a variety of different visual (graphical) formats.

The aggregated data displayed in FIG. 4 includes a driver's name, the driver's cell phone number, the total number of trips, the total average mileage per trip, the total mileage, the total duration of trips, the number of calls made, the number of calls received, the average call duration, the total call duration, the number of text messages sent, the number of text messages received, the number of text messages responded, and the data usage. The graphical formats illustrated in FIG. 5 include the percentage of distracted drivers (drivers with cell phone usage events in the context of driving trip), the distractions (events) per trip, the distractions per hour, the distractions per mile, the average call time (or time spent doing other things, like accessing applications, surfing the Web, text messaging, etc.) and the percentage of talk time. As discussed above, the data can be presented for an administrator, a group of users or for a single user. In addition, embodiments enable a user to customize the data presented in the table from FIG. 4 or the graphs of FIG. 5.

Figure 5:
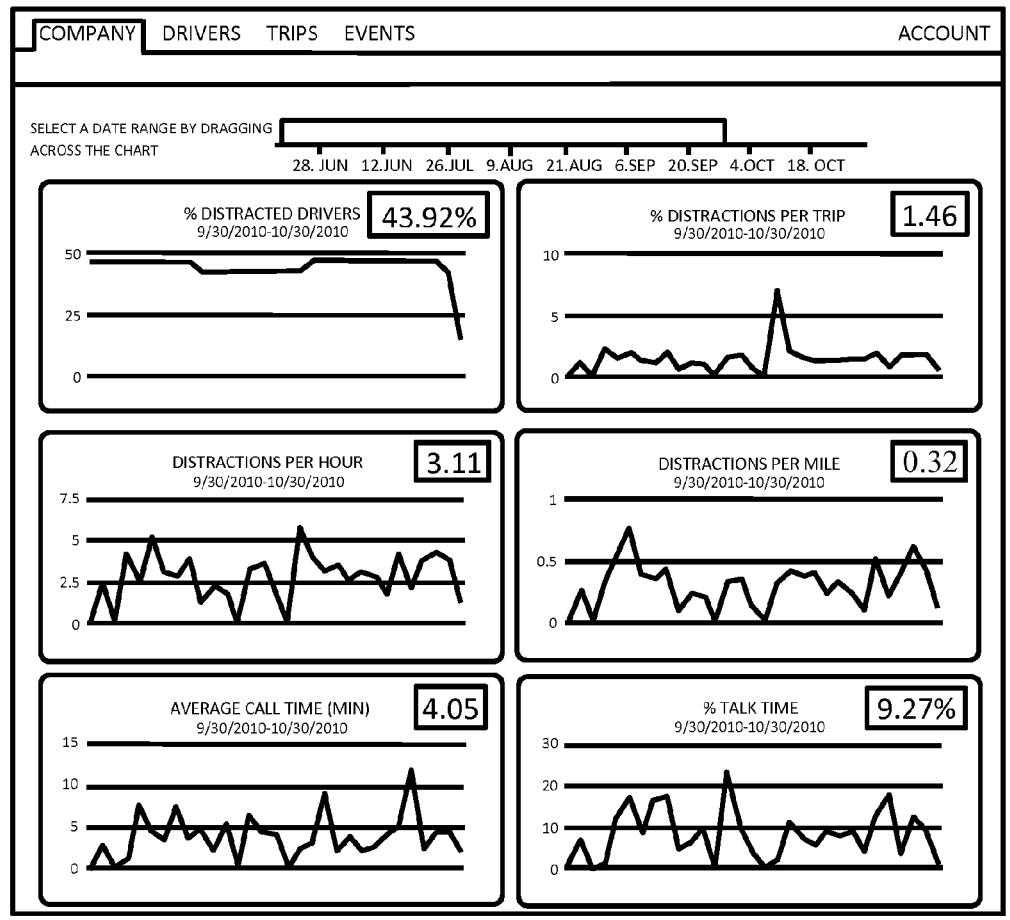
FIG. 5 illustrates aggregated data for a plurality of drivers presented in a variety of different visual formats.

In an embodiment, individual driver profiles of cell phone usage events can be ranked and compared against other, individual drivers, groups of drivers, or the enterprise of drivers in a table, chart or other graphic format, such as those illustrated in FIG. 5. Embodiments include presenting data representing cell phone events in the context of operating a motor vehicle during specific time and date intervals to an administrator, a user, a group of users or an enterprise of users where individual driver profiles of cell phone usage events are ranked and compared against other individual drivers, groups of drivers or the enterprise of drivers in a table, chart or other graphic format. Individual driver profiles of cell phone usage events can also be shown and compared against trends associated with such events over a period of time to other individual drivers, groups of drivers or the enterprise of drivers in a table, chart or other graphic format.

Data representing cell phone events for a single driver or for a plurality of drivers in the context of operating a motor vehicle during specific time and date intervals can also be presented per trip (start and stop event or however defined by the user), per second, minute, hour, day, week, or month or per mile/km driven, as well as in many other manners. In addition, embodiments can identify a set of key performance metrics for an individual driver profile, a group of driver profiles or an enterprise of driver profiles. Performance metrics can include the percent of drive time on phone calls;

percent of drive time receiving and sending text messages, total events per trip, call length (all calls, inbound only, or outbound only), etc.

Embodiments further send alerts to one or more users based on specific triggers. The alerts can be sent via email, text message, voice message, automated phone call, instant message, or some other form of text or voice communication. Recipients of the alerts can include one or more administrators, a user (the driver, for instance), a group of users, or an entire enterprise of users. The triggers can be based on usage events, risk events, or many other criteria, including a time and date range, a cell usage event type, a frequency of an event or frequency of a number of events, duration of a single event, the relative proximity in terms of time and distance between a cell phone usage event and a risk event), total duration of a number of events, duration of a number of events over a period of time, and/or other characteristics of cell phone usage events or collection of cell phone usage events. In alternative embodiments, the triggers can also be based on a predefined policy or via a selection or configuration by a user. The policy can enable a user to specify triggers based on the type of event, the frequency of the event, the duration of the event, the frequency of a plurality of events, the duration of a plurality of events, or some other characteristics of cell phone usage events. Triggers can also be based on historical comparison of individual or aggregate cell phone usage events for a specific driver, group of drivers or enterprise group of drivers.

The program can also perform other actions, such as creating, managing and operating an employee or driver recognition/remediation program, where employees or drivers are rewarded, reprimanded or remediated based on the information captured for a driver, a group of drivers or an entire enterprise of drivers. If an employee or driver should be rewarded, the program can issue a message to the driver, such as a recognition email, alert, etc., based on the appropriate level of cell phone usage data, which email, alert, etc., could include a smiley face, an award, online credits, or any of a number of other types of rewards or remuneration. Alternatively, if the usage data indicates that the employee/driver has engaged in risky behavior, the employee/driver could be reprimanded in some way, i.e., issuing a "frowney face" instead of a smiley face, etc. Instead of reprimanding the employee/driver for doing something risky, a different approach could be utilized, such as attempting to remediate the employee's/driver's behavior. For example, in addition to or aside from getting a frowney face email, the employee/driver can also be asked to participate in an online training class—the workflow and completion of which are managed by the program and recorded in the driver's record. A remediation approach allows a company to demonstrate that it is not only monitoring the employees/driver, but also actively managing the behavior of such employees/drivers who need the help.

In embodiments, information regarding cell phone usage events, including time and date for such events, can include call detail records from one or more mobile carriers or intermediaries, whether the data is unrated or rated, and whether such records are sent in a defined interval (e.g. end of month billing cycle) or in real-time or near real-time; logs or other information from email servers associated with cell phone usage events such as emails (sent, received, or read); logs or other information from application servers associated with such cell phone usage events; logs or other information from mobile applications associated with cell phone usage events; and logs or other information from mobile servers associated with cell phone usage events. FIGS. 6A and 6B illustrate sample call detail records and log events for a driver. In particular, the embodiment illustrated in FIG. 6A presents records separated into phone call detail records, while the embodiment illustrated in FIG. 6B presents text messaging records and email records. The records for the phone calls include the driver's name, the driver's phone number, the event, the start and stop time of the event, and the duration of the event. Access to the cell phone usage events can be obtained directly from the mobile carrier network or billing system or through a portal (e.g. billing portal) on a user's behalf or other ways that are commonly understood by a person of ordinary skill in this area and as currently practiced by telecom expense management (TEMS) companies.

While it is relatively straightforward to capture and report inbound and outbound calls and outbound email and text messages because a record of such events are often captured by the service provider to the mobile device being used, and made available to the driver or others, at least for billing purposes, it is much more difficult to capture other events, such as inbound text and email messages or the driver's usage of the mobile device to interact with a website or other computer system to send and receive email and messages, especially where the software being used is not on the user's mobile device. Likewise, while it might be possible to identify incoming text messages, it is much more difficult to know whether the user looked at an incoming message and whether an outbound message was in response to an incoming message, which might indicate much greater distraction over a longer period of time. For this reason, in an embodiment, inbound text messages are not considered to be events because there is no evidence to suggest that the driver read the message, even though it landed on the monitored mobile device. If the system/program had access to the short message service (SMSC) for the monitored device, it would be possible to view the read receipt message/log generated by the SMSC system, but such information is generally not available to third party applications.

In an embodiment, the system/program tracks what is referred to herein as a "text response" or a "call response" for the monitored device. In this embodiment, the inbound call or text message is counted as a risk (e.g. cell phone usage event) when an outbound call or text message uses a phone number that matches the phone number of a recently received inbound call or text message. Through user preference selection, the system/program can be set to determine what constitutes a "recently received" inbound call/message. For example, the system/program could be set to only count inbound calls/messages that occur during a driving trip, or which are close in time to a driving trip, or which were received within a certain period of time of a matching outbound call/message. In an embodiment, inbound text messages are counted as risk events if a certain type of driver response (such as a hard brake, swerve, etc.) occurs within a specified period of time of receiving the message. In such cases, the proximity of the driver response to the inbound event provides a reasonable level of circumstantial evidence that the driver most likely attempted to read the inbound message.

FIG. 7 also illustrates trip information for a driver displayed in tabular format. The top part of the figure illustrates general information about various trips taken by a driver, including the start and stop date and time of the trip, the total duration of the trip, and the total mileage of the trip. The bottom part of the figure illustrates all of the events that occurred during a single trip. The first event is the beginning of the trip and the last event is the end of the trip. All of the events in between occurred over the duration of the trip, in this case the events simply recording the location of the driver at various times, as well as or in addition to the specific location of the driver at the time of specific events. In the event it is not possible to obtain specific location information from a location service associated with the cell phone, an approximate location of the cell phone event could be determined based on the time/date of the cell phone event, the approximate speed of the vehicle at or around the time of the event, the road conditions, the traffic conditions and other information.

The display panel for the bottom of FIG. 7 also includes columns for providing access to environmental data, including weather, traffic posted speed limits and day light data, but could likewise provide access to cell phone usage data plus other attributes including distance/mileage, school zones, construction zones, other areas of interest, speed, type of road (e.g. straight, curvy, etc.), and other characteristics which may impact the safety of a driver operating a motor vehicle, whether for a single driver, a group of drivers or an entire enterprise of drivers in the context of operating a motor vehicle during specific time and date intervals. As discussed above, the display interface or panel is accessible to a user via a website, a cloud/web/server-based application, an RSS feed, a PC application, or a mobile application. In an embodiment, the display panel can be accessed by one or more administrators. Depending on access levels, the display panel can be accessed by an individual user, a group of users, or an enterprise of users. The cell phone usage data can also be presented for each cell phone usage event.

Cell phone usage data plus other attributes including location, school zones, construction zones and others areas of interest, speed, posted speed limit, day light, type of road (e.g. straight, curvy, etc.), weather, traffic, and other characteristics which may impact the safety of a driver operating a motor vehicle for a single driver, a group of drivers or an entire enterprise of drivers in the context of operating a motor vehicle during specific time and date intervals, can be presented via the display interface to one or more users or administrators, including a single user, a group of users or an entire enterprise of users, where such cell phone usage events are presented in the aggregate, the mean, median and average of such events, for each driver, across a group of drivers or for an entire enterprise of drivers. Usage events can be shown as just usage events, as usage events in combination with other data that can enable a user to make their own determination as to whether a usage event constitutes a risk event, or usage events can be filtered by the system/program according to various rules and in view of the other data, to specifically define risk events, which can then be displayed in a variety of formats. As submitted above, such cell phone usage data and/or risk events can be presented in a table, graphic, or some other visual format. In addition, individual driver profiles of cell phone usage events and/or risk events can be ranked and compared against other individual drivers, groups of drivers or the enterprise of drivers in a table, chart or other graphic format. Individual driver profiles of cell phone usage events and/or risk events can also be shown and compared against trends associated with such events over a period of time to other individual drivers, groups of drivers or the enterprise of drivers in a table, chart or other graphic format.

As submitted above, alerts can be sent to a plurality of recipients based on several triggers. The triggers can also include other characteristics of cell phone usage events and/or risk events or collections of cell phone usage events and other attributes including distance/mileage, locations, school zones, construction zones and other areas of interest, speed, posted speed limit, day light, type of road (e.g. straight, curvy, etc.), weather, traffic, and other characteristics which may impact the safety of a driver operating a motor vehicle. The recipients can include one or more administrators, including a user, a group of users, or an entire enterprise. Alerts can also be sent based on a policy or a selection for other characteristics of risk events and/or cell phone usage events or other attributes including distance/mileage, location, school zones, construction zones and other areas of interest, speed, posted speed limit, day light, type of road (e.g. straight, curvy, etc.), weather, traffic, and other characteristics which may impact the safety of a driver operating a motor vehicle. Triggers can further be based on historical comparisons of individual or aggregate cell phone usage events and/or risk events for a specific driver, group of drivers or enterprise group of drivers.

Figure 8:
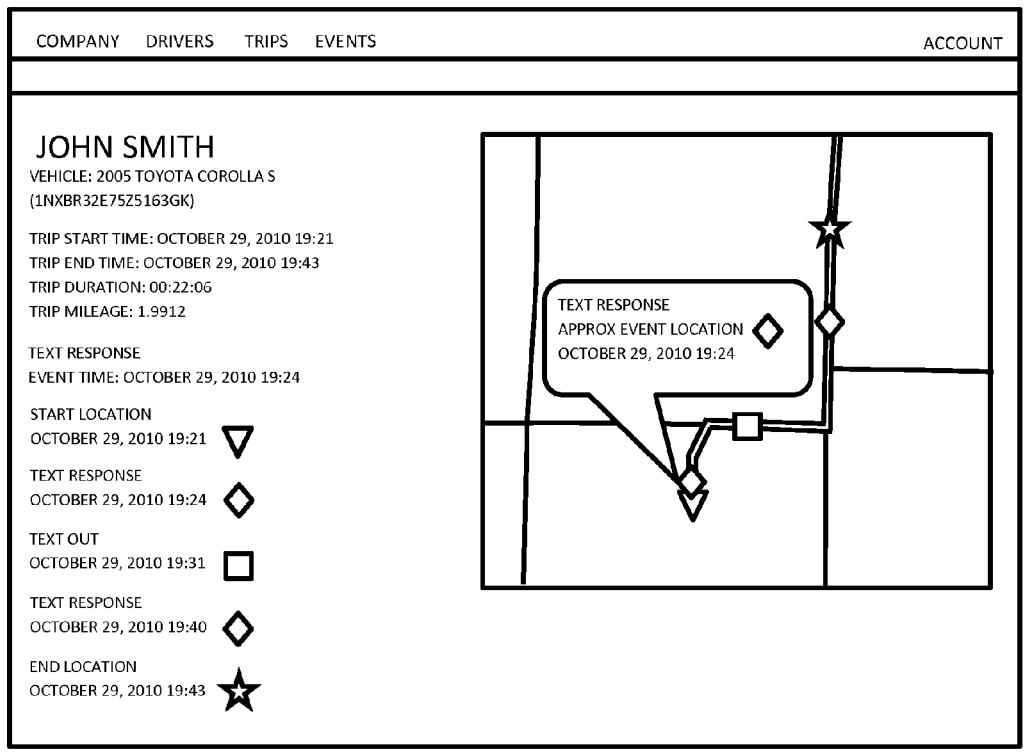
FIG. 8 illustrates a trip for a driver and associated events in a written format and on a map in accordance with an embodiment.

An embodiment of the display panel displays data representing risk events and/or cell phone events in the context of operating a motor vehicle during specific time and date intervals to an administrator, a user, a group of users or an enterprise of users where each event is shown on a map including other attributes associated with each such event including distance/mileage, speed, location, school zones, construction zones and other areas of interest, weather conditions, day light, posted speed limits, traffic, etc. FIG. 8 illustrates such an embodiment where an event for a driver named John Smith, driving a specific vehicle identified by the year, make and model of the vehicle as well as a vehicle identification number. As illustrated, the start and stop time of the trip is indicated, along with the duration of the trip and the mileage of the trip, and details regarding one or more events. As shown in FIG. 8, John Smith started his trip at 19:21 and within seconds sent a first text response, followed by an initiated text message at 19:31 and a second text response at 19:40, before ending the trip at 19:43. On the map provided, the starting and ending locations are indicated by icons, as are the two text responses and the initiated text message events, along with a line indicating the trip route taken by John Smith. If a particular icon is selected by a user, detailed data associated with that icon can be displayed in a separate text box, as illustrated for the first text response of FIG. 8.

Yet another embodiment of the display panel can also display risk events and/or cell phone usage data plus other attributes including location, school zones, construction zones and other areas of interest, speed, posted speed limit, day light, type of road (e.g. straight, curvy, etc.), weather, traffic, and other characteristics which may impact the safety of a driver operating a motor vehicle for a single driver, a group of drivers or an entire enterprise of drivers in the context of operating a motor vehicle during specific time and date intervals to a group of users or an enterprise of users on a map (through a website, an web/server-based application, an RSS feed, a PC application, a mobile application), where such risk events and/or cell phone usage data is presented for each risk event and/or cell phone usage event (phone calls (sent, received and duration), text messages (sent, received) plus other attributes including location, school zones, construction zones and other areas of interest, speed, posted speed limit, day light, type of road (e.g. straight, curvy, etc.), weather, traffic, and other characteristics which may impact the safety of a driver operating a motor vehicle.

In an embodiment, instead of identifying certain cell phone usage events as risk events, each event from the plurality of cell phone usage events is scored for a risk factor/score based on the type, characteristic, frequency, and duration of the specific cell phone event. The risk factor/score can subsequently be included in the presentation and alerting for such event for a user, a group of users or an entire enterprise of users. Events can also be scored for a risk factor/score based on the type, characteristic, frequency, duration of the specific cell phone event plus other attributes including location, school zones, construction zones and other areas of interest, speed, posted speed limit, day light, type of road (e.g. straight, curvy, etc.), weather, traffic, and many other characteristics which may impact the safety of a driver operating a motor vehicle event. The corresponding risk factor/score can be included in the presentation.

FIG. 9 illustrates a sample scoring methodology for specific cell phone usage events. It is noted that embodiments are not limited to the scoring methodology and scoring scales presented in FIG. 9. The scoring methodology assigns a grade for one or more events from a plurality of events, taking into account a variety of factors, such as the frequency, location, proximity, etc. of a cell phone usage event and risk events. The events that are scored can be predefined, or they can be selected by a user or an administrator. For example, an individual user may not be interested in his/her scores for cell phone usage events while driving, but parents would be interested in the scores of cell phone usage events for their children. Similarly, an administrator or manager would be interested in the scores of cell phone usage events for the employees of a company of enterprise, or an insurance company would be interested in the scores for the purpose of establishing insurance rates for the driver or a group of drivers. In the figure, each event is scored with a letter grade.

As illustrated in FIG. 9, the letter grade is associated with a numeric value corresponding to an attribute of the particular event. For example, in the calls made column, a letter grade of "A" is awarded if no calls are made by the driver during driving trips, a letter grade of "B" is awarded if only one call is made, a letter grade of "C" is awarded if two calls are made, a letter grade of "D" is awarded if three calls are made, and a letter grade of "F" is awarded if four or more calls are made. A similar scoring scheme is presented for the other events. In the SMS received event, an A is awarded if the driver receives only one text message during a driving trip, whereas an F is awarded if the driver receives over 7 text messages during a driving trip.

The bottom half of FIG. 9 also illustrates the average scores received for each of the events per trip. The bottom right half of the figure also illustrates the average scores per trip, along with a listing of the worse count of that particular event and the best count of the particular event. For instance, the first row shows that an average of 0.793014 calls were made per trip, with the worse count being 10 and the best count being 1. This means that during a particular trip, the driver made 10 phone calls. On the other hand, during another trip, the driver made only one phone call. A similar chart can be used to show how a specific driver compares to other drivers or a group of drivers, were the best and worst counts, rather than representing a particular number of events, such as phone calls, are representative of the best and worst collective behavior by an individual or within a group of individuals. What counts toward the collective behavior could vary. In some cases, it could be a combination of all cell phone usage events, where in others it might just represent driver initiated behavior, such as calls made and SMS sent. Scoring could be determined differently by individual users based on certain user selection options provided to the user. Scoring could also be displayed non-numerically, such as by various symbols, colors, etc.

Figure 10:
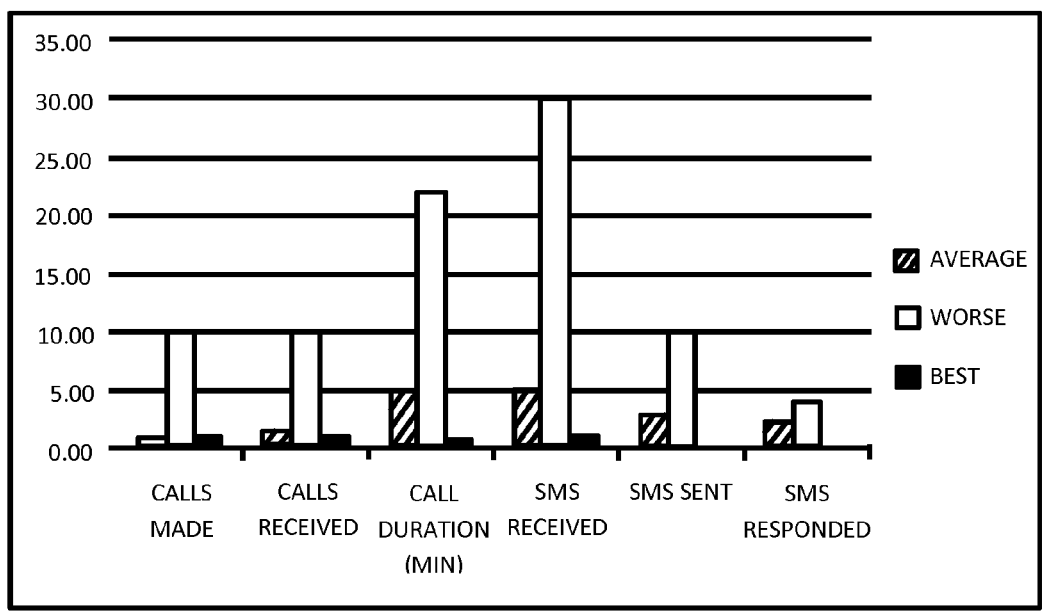
FIG. 10 illustrates a graphical representation of cell phone usage events in accordance with an embodiment.

For example, FIG. 10 illustrates a sample graphical representation of cell phone usage events. As discussed above, cell phone usage data for a single driver or for a group of drivers can be displayed using a variety of display formats. FIG. 10 illustrates the average scores, the worse scores, and the best scores received for an enterprise in a bar chart format, that can use gray-scale, colors, and different fill patterns for the bars. However, alternative embodiments can present the average scores, the worse scores, and the best scores for an individual driver, or for two or more drivers in a wide variety of manners.

Figure 11:
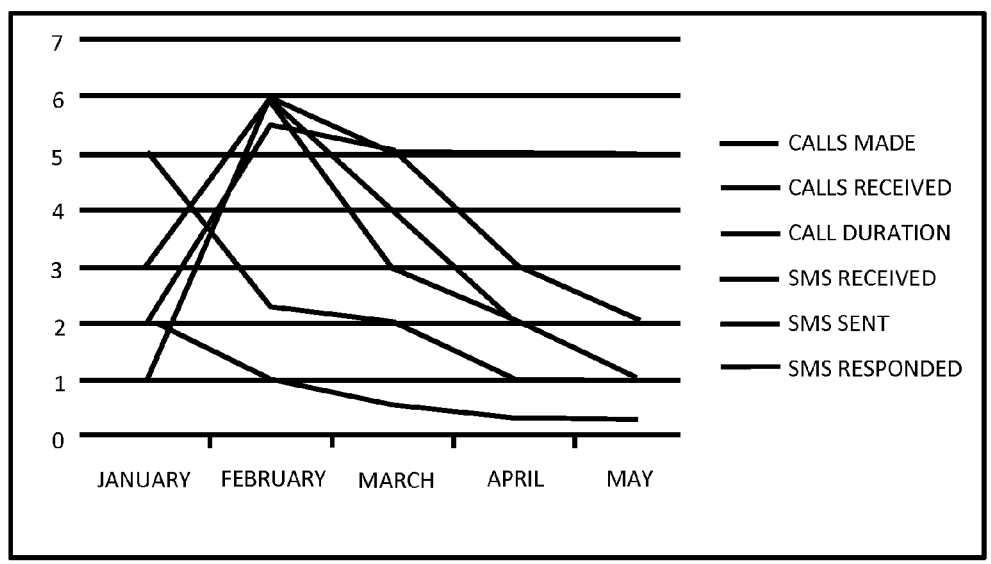
FIG. 11 illustrates a visual representation of cell phone usage data in accordance with an embodiment.

FIG. 11 illustrates an alternative visual representation of cell phone usage data, although risk events could be similarly displayed. The line graph from FIG. 11 presents cell phone usage events displayed over a period of time, comparing the trends of various cell phone usage events, over the specified period. The events compared include calls made, calls received, call duration, text messages received, text messages sent, and text messages responded, although any number of different events could be selected for display, along with any desired period of time, and using any desired type of historical representation.

Each event can also be scored for a risk factor/score based on the type, characteristic, frequency, and duration of a specific cell phone event and where such risk factor/score is included in the presentation and alerting for such event for a user, a group of users or an entire enterprise of users on a map. Alternatively, each cell phone usage event can be scored for a risk factor/score based on the type, characteristic, frequency, duration of the specific cell phone event plus other attributes including location, school zones, construction zones and other areas of interest, speed, posted speed limit, day light, type of road (e.g. straight, curvy, etc.), weather, traffic, and other characteristics which may impact the safety of a driver operating a motor vehicle event. Such risk factor/score can be included in the presentation and alerting for such event, user, group of users or enterprise of users on a map.

Figure 12:
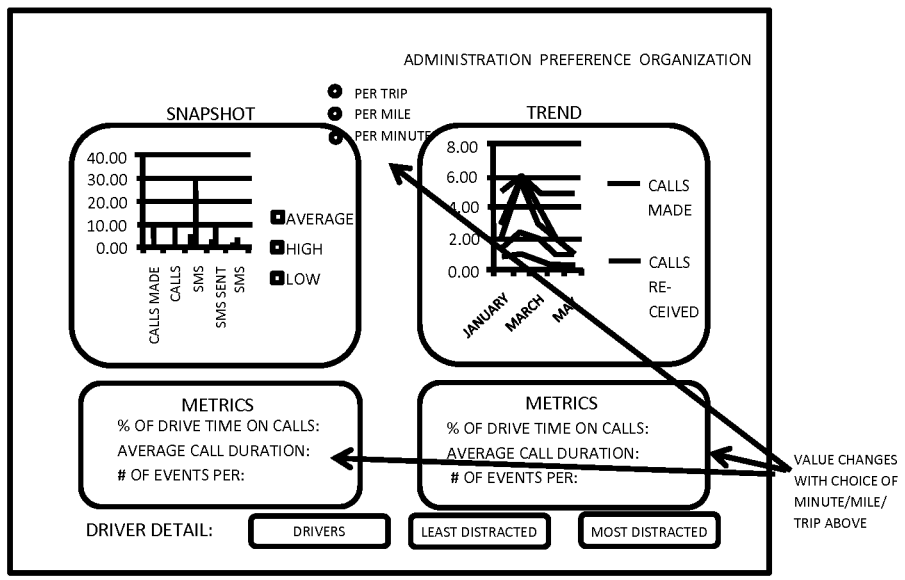
FIG. 12 illustrates a dashboard display interface in accordance with an embodiment.
Figure 13:
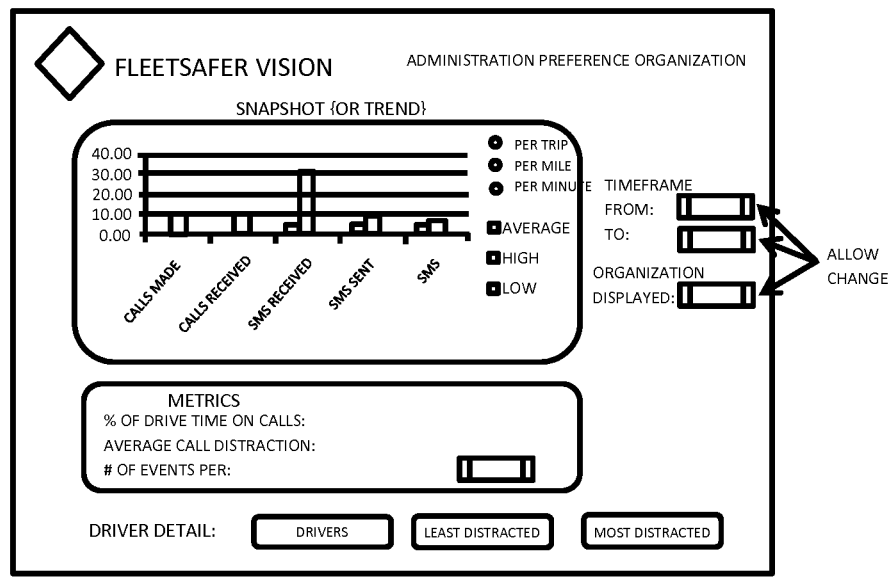
FIG. 13 illustrates the presentation of data via a dashboard display interface.
Figure 14:
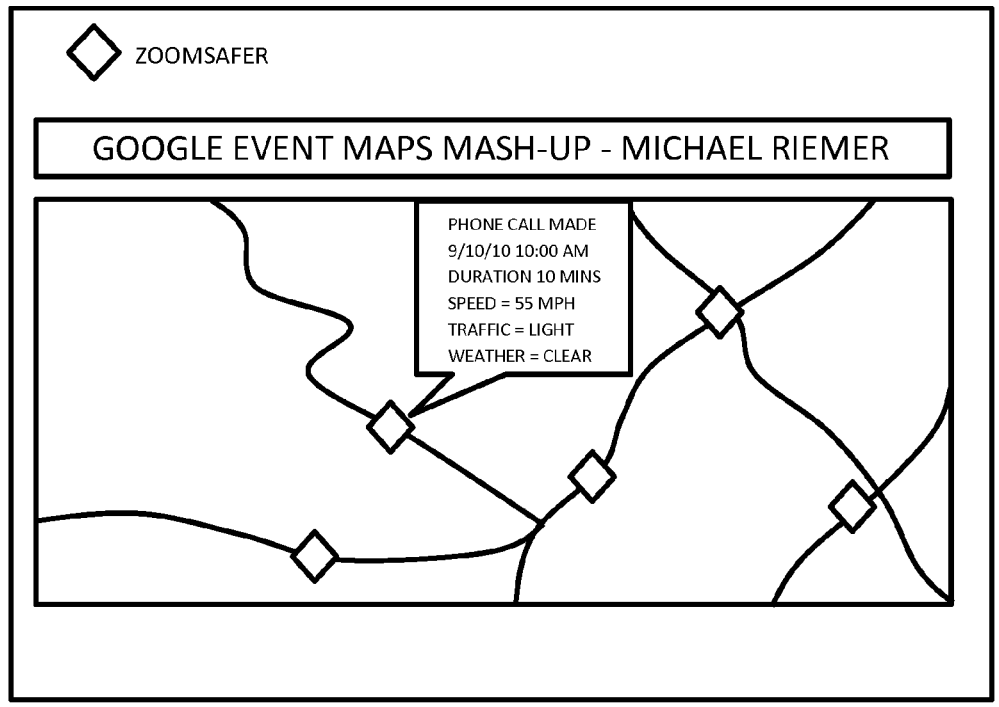
FIG. 14 illustrates a map displaying cell phone usage events.

FIGS. 13 and 14 illustrate embodiments of the presentation of data via a dashboard as the display interface. FIG. 12 illustrates an embodiment of the dashboard for an enterprise where the user can select to display event data based on different metrics, such as per trip, per mile or per minute, by selection of an appropriate radio button, which results in the visual data changing according to the metric chosen. In the embodiment, both a snapshot display and a trend display are illustrated for the drivers of the enterprise, along with an explanation of each metric. Buttons are also provided for enabling users to drill down to details about each of the drivers, or those drivers that are the least or most distracted. FIG. 13 provides an illustration of a drill down from the top level of the dashboard, which can be initiated by selecting the snapshot or trend displays from FIG. 12. In FIG. 13, users are still presented with the option of further drilling down to driver specific data, and also have the option of changing different aspects of the display data, for example, by selecting the timeframe, the organization, such as a subsidiary or division, or other aspects not illustrated in FIG. 13.

FIG. 14 is another example of how an event, such as a cell phone call, could be illustrated on a map. In FIG. 14, a sample map displays a phone call event, represented by an event icon, with the phone call event further including additional context information indicating the speed of the vehicle when the phone call was made, the traffic conditions and the weather conditions within a text box. Other event icons illustrated on the map could be selected by the user to illustrate other events associated with the driver.

In embodiments, the call detail records associated with cell phone usage events can be combined with information collected from additional sources, referred to herein as a log associated with additional data resources, which can take many different forms. For example, with regard to smart phones that have text messaging, games and Internet access that all require data to be sent over a carrier's network, the call detail records from the carrier may only include the total amount of data used, such as the total number of megabytes used or bandwidth consumed, which may or may not be useful in terms of attempting to truly analyze a smart phone user's activity while driving. In embodiments, usage information from other sources can be combined with the limited data usage information associated with call detail records to develop an enhanced level of detail regarding the driver's activities.

Such improved call detail records enable a user, such as a parent, a manager, or an administrator to track and analyze the risk associated with data usage events, which tend to require more attention of the driver than typical phone calls. These additional sources include, but are not limited to, applications running in the driver's portable electronic device, applications running in a remote network location, applications running in the cell phone carrier's server, websites visited by the driver, and other sources that currently exist or are yet to be developed. The information from these additional sources can be obtained by accessing logs associated with the additional sources, examining the data and traffic associated with the additional sources, using an API to query and access the data associated with the additional sources, or by examining reports and other statistics associated with the additional sources.

In embodiments, the additional sources include social networking sites or applications associated with social networking sites. Popular social networking sites include the FACEBOOK website, the TWITTER website, the MYSPACE website, the LINKEDIN website, among others. Hence, rather than merely indicating that a driver used 10 MBs during a day, embodiments can indicate that 2 MBs were used for visiting the FACEBOOK website, 3 MBs were used while browsing other websites, 2 MBs were used for reading and sending email, and 3 MBs were used for streaming music. Similarly, time can be used in place of data usage, e.g., the driver spent 15 minutes surfing a website, spent 10 minutes reading FACEBOOK updates, etc.

As indicated above, the driving context is used to determine which data usage events occurred during a driving trip. Data usage events that were started prior to a driving trip may also be scored differently than events that were started during the driving trip. For instance, the driver may begin music streaming prior to a driving trip, with the music streaming continuing over the duration of the driving trip without further driver input or interaction. On the other hand, if the driver's action of beginning the music streaming during the driving trip would have required the driver to interact with the portable electronic device while driving, a considerably greater degree of driving risk might be indicated. Likewise, even if the driver started the music streaming prior to driving, if the user then accesses the streaming service over and over again while driving, such as to change songs, indicate songs the driver likes or dislikes (a feature available with the PANDORA streaming service), to change channel, etc., the streaming activity could be very risky.

Information can also be captured from a driver's social graph, with the usage including postings made in a plurality of websites, status updates made in a plurality of websites, messages sent or received via a plurality of websites, and browsing information from a plurality of websites. Application layer usage can also be examined to identify driver interaction with a specific application or a set of applications on the device. For instance, the application layer usage may be determined by examining back-end application logs and reports. While examining data usage at the application layer is preferable, alternative embodiments can examine data, packet data, and traffic associated with an application or with a website at a lower level layer of the network stack. Deep packet inspection, when available, can also be used to determine data usage. As indicated above, website browsing information and website usage information can also be collected via the carrier network or by querying the corresponding website for usage data associated with the driver.

In embodiments, collected data usage can be presented to an administrator or to some other user in various forms, including tables, graphs, and other visual formats. The data usage can be presented for one or more drivers, for one or more drivers over a period of time, for one or more drivers for a single driving trip, for one or more drivers that meet one or more conditions, for one or more drivers per application or website, and for one or more drivers per type of data usage. For instance, data usage can be presented for a single driver for the FACEBOOK application, or data usage associated with the FACEBOOK application and the TWITTER application, or data usage associated with all social networking sites, etc.

Embodiments also further differentiate data usage between various applications. In addition, embodiments differentiate and keep track of data usage associated with driver initiated applications/sessions versus date usage associated with applications/sessions initiated by a background process/service. It is common to have a number of background processes, services, or sessions in portable electronic devices and smart devices. Therefore, embodiments described herein use the data generated and associated with the additional sources to determine the applications or services the driver interacted with while the driver was driving, and not the device initiated processes or services, although such data can also be collected and utilized for other purposes.

In embodiments, an administrator, manager, or a user has the ability to specify the actual applications and/or websites for which it is desired to track detailed data usage while driving. For instance, an administrator may be interested in detailed data usage associated with social networking sites, as social networking sites typically consume a large amount of bandwidth and demand more attention from the driver compared to other activities, such as making phone calls or listening to music. In such a case, the administrator may specify that data usage for the FACEBOOK application and for email usage, and other driver intensive activities (i.e., activities that require greater interest or attention from the driver), to be tracked while the driver is driving, while only tracking total data consumption associated with all other data usage, such as driver activities that are less intensive. The administrator may also specify that a first set of applications are to be tracked for data usage for a first group of drivers, while a second set of applications are to be tracked for data usage for a second group of drivers.

As noted above, triggers and alerts can also be associated with specific types of data usages or specific data usages. For instance, an alert may be sent to an administrator whenever a driver makes a post to a social networking site, when a driver exceeds a data usage threshold, or when a driver visits a particular website.

Drivers can be ranked and assigned a letter grade or some other form of ranking based on their data usage while driving. The ranking or letter grades can be assigned based on cell phone usage events while excluding data usage, based on cell phone usage events combined with data usage, based on data usage alone, or other criteria. Scores can be based on a default set of rules and preferences, or a set of rules and preferences created by an administrator or a user. The use of certain applications or actions associated with certain websites may receive lower scores than other applications and other websites. Scores can also be based on the actual action performed by a driver while driving. For instance, posting a message to the TWITTER website may receive a first risk score, while posting a message to the FACEBOOK website may receive a second risk score different than the first risk score.

Likewise, even without accessing data from social networking websites and other types of websites themselves, a certain level of activity can still be determined about the driver's behavior associated with such websites. For example, if it is possible to obtain a list of websites visited by a driver from the driver's smart phone, uploading activity can be distinguished from downloading activity, and ranked differently. This might not be possible if a carrier's data only indicates total data usage, but if the carrier differentiates between data sent and data received, certain driver behavior can be inferred. While any interaction with a website requires a certain amount of data to be sent to the website, such as driver names, passwords, cursor movement, selections, page views, etc., other types of interaction require a significantly larger volume of data to be sent or time to be spent by the driver over the network or on the device. The input of text for correspondence, the uploading of other data, such as pictures and movies, etc., would significantly increase the amount of data sent, thereby indicating a different level of driver activity over merely accessing and viewing the website in question. Alternatively, time spent reading, reviewing and entering data associated with specific applications, websites, etc. can also be monitored and used as an indicator of driver activity, especially since on-device activity and application and website navigation activity also impact a driver's focus while driving.

As noted above, the type and amount of data collected will be dependent on the applications/websites used by the driver and on a set of preferences set by an administrator. Data usage associated with web browsing can also be tracked by examining the browsing history and the cache generated by the web browser in the portable electronic device. Some carriers might make similar types of data, such as browsing history available, in a variety of reports or logs. The reports or logs associated with such data usage, in accordance with embodiments, can consist of a listing the websites and applications used by one or more drivers while driving. For a first driver, the report may show that the first driver visited a map website to obtain driving directions and visited a restaurant website during a particular driving trip. The administrator may further customize the reports to view a greater level of detail for data usage for one or more drivers. For the first driver, this may include the amount of time spent by the driver browsing and using the map website and the amount of time spent browsing the restaurant website. Further details that can be displayed to the administrator include the total amount of data consumed while visiting a website and a summary of the actions performed by the driver while visiting a website or using an application. In the case of a social networking website, the summary of actions may show that the driver spent a total of 2 minutes visiting the social networking site while driving, made one post to the social networking site, and read three posts from friends X, Y and Z.

Data collected and reports and logs generated as specified herein can also be combined with other services provided by other parties, such as an insurance company that utilizes a driving analysis tool to monitor an insured driver's driving habits, such as speeding, fast starts, sharp breaking, etc. By combining distracted driving data with other driving data, an insurance company can get a much more accurate perception of the risk associated with continuing to insure a particular driver.

An embodiment of a program storage device readable by one or more machines, tangibly embodying a program of instructions executable by the machines to perform program steps for generating and utilizing a database of driving trip data and usage event data to identify when one or more drivers could be distracted by one or more portable electronic devices used by the one or more drivers while driving one or more vehicles, the program steps comprising: determining one or more driving trips for the one or more drivers based on driving trip data from one or more data sources; identifying usage event data for the one or more portable electronic devices; determining one or more driving contexts for the one or more drivers based on the one or more driving trips and context data from the one or more data sources; filtering the usage event data based on the driving context to create a set of distracted driving events occurring during the one or more driving trips; and taking one or more actions based on the set of distracted driving events.

The embodiment of the program storage device, wherein the usage event data includes a phone call placed, a phone call received, a phone call duration, a text message sent, a text message received, a text message response, an email sent, an email received, and an email response.

The embodiment of the program storage device, wherein the usage event data includes a text message received, and wherein the step of filtering excludes the text message received from the set of distracted driving events.

The embodiment of the program storage device, wherein the usage event data includes a text message received, a phone call placed and a text message sent, the text message received corresponding to a first phone number, and either the phone call placed or the text message sent corresponding to a second phone number, and wherein the step of filtering includes the text message received in the set of distracted driving events if the first phone number matches the second phone number and if the text message sent was sent or the phone call placed was placed within a predetermined time period of the text message received being received.

The embodiment of the program storage device, wherein the usage event data includes a text message received, wherein the context data includes risky driving behavior data, and wherein the step of filtering includes the text message received if the risky driving behavior data occurs close in time to the text message received being received.

The embodiment of the program storage device, wherein the one or more data sources include one or more electronic data sources characterizing at least an operation, a location or a movement of the one or more vehicles.

The embodiment of the program storage device, wherein the context data includes one or more actions by the one or more drivers indicating risky behavior.

The embodiment of the program storage device, wherein the context data includes environmental data associated with the one or more vehicles during the one or more driving trips.

The embodiment of the program storage device, wherein the location is determined based on telemetry data for the one or more vehicles from the one or more electronic data sources.

The embodiment of the program storage device, wherein the location is determined based on telemetry data for the one or more portable electronic devices from the one or more electronic data sources.

The embodiment of the program storage device, wherein the location is determined based on a time and a date for one or more usage events of the one or more portable electronic devices among the usage event data, an approximate speed of the one or more vehicles at the time of the one or more usage events, and environmental data associated with the one or more vehicles at the time of the one or more usage events.

The embodiment of the program storage device, wherein the one or more data sources include one or more manually entered data sets characterizing at least an operation, a location or a movement of the one or more vehicles.

The embodiment of the program storage device, wherein the step of taking one or more actions includes displaying at least a portion of the set of distracted driving events on a display.

The embodiment of the program storage device, wherein the step of displaying includes displaying the portion in a visual format.

The embodiment of the program storage device, wherein the visual formal includes a graphic, a map, a report, a table, a listing, or a chart.

The embodiment of the program storage device, wherein the step of displaying includes displaying the portion for the one or more driving trips.

The embodiment of the program storage device, wherein the step of displaying includes the steps of: aggregating data from the set of distracted driving events to generate an aggregated data set of distracted driving events for a plurality of drivers among the one or more drivers; and displaying the aggregated data set of distracted driving events.

The embodiment of the program storage device, wherein the step of displaying includes the steps of: aggregating data from the set of distracted driving events to generate an aggregated data set of distracted driving events for a plurality of drivers among the one or more drivers; comparing the set of distracted driving events for a driver among the one or more drivers to the aggregated data set of distracted driving events to create a comparative set of distracted driving events; and displaying the comparative set of distracted driving events.

The embodiment of the program storage device, wherein the step of displaying further includes displaying an indication of one or more actions by the one or more drivers indicating risky behavior.

The embodiment of the program storage device, wherein the step of displaying further includes displaying an indication of environmental data associated with the one or more vehicles during the one or more driving trips.

The embodiment of the program storage device, wherein the environmental data is selected from the group consisting of a location, a school zone, a construction zone, a vehicle speed, a posted speed limit, a day light, a type of road, a weather condition, a traffic condition, and a factor having an impact on the safety of the one or more drivers or the safety of people or properties near the one or more drivers.

The embodiment of the program storage device, wherein the step of taking one or more actions includes sending an alert to one or more recipients in response to one or more triggers associated with set of distracted driving events.

The embodiment of the program storage device, wherein the alert is selected from the group consisting of an email, a text message, a voice message, a phone call and an instant message.

The embodiment of the program storage device, wherein the step of taking one or more actions includes issuing a message to the one or more drivers based on the set of distracted driving events.

The embodiment of the program storage device, wherein the step of taking one or more actions includes rewarding the one or more drivers based on the set of distracted driving events.

The embodiment of the program storage device, wherein the step of taking one or more actions includes remediating the one or more drivers based on the set of distracted driving events.

The embodiment of the program storage device, wherein the step of remediating includes managing completion of an online training class for the one or more drivers.

The embodiment of the program storage device, further comprising the steps of identifying a driver among the one or more drivers and identifying vehicle among the one or more vehicles driven by the driver during a driving trip.

The embodiment of the program storage device, wherein the step of identifying the driver includes identifying the driver by at least a name, a portable electronic device, or an identification.

The embodiment of the program storage device, wherein the step of taking one or more actions includes identifying a set of portable device usage metrics from the usage event data for the one or more drivers during the one or more driving trips.

The embodiment of the program storage device, wherein the set of portable device usage metrics include a percent of total time spent using the one or more portable electronic devices, a total number of usage events per the one or more driving trips, and a total number of usage events per a given time period or a given distance driven during the one or more driving trips.

The embodiment of the program storage device, wherein the step of filtering includes assigning a risk factor and a score to one or more usage events among the usage event data.

The embodiment of the program storage device, wherein the risk factor is based on the context data and environmental data.

The embodiment of the program storage device, wherein the risk factor is based on one or more actions by the one or more drivers indicating risky behavior.

The embodiment of the program storage device, wherein data acquired from the one or more data sources includes an identification of an application or a service accessed by the one or more portable electronic devices.

The embodiment of the program storage device, wherein the data acquired from the one or more data sources includes one or more of a bandwidth consumed in association with the application or the service, an amount of time spent using the application or the service, and an action associated with the application or the service.

The embodiment of the program storage device, wherein the application accessed by the one or more portable electronic devices includes an application running on the portable electronic device and an application running in a remote network location.

The embodiment of the program storage device, wherein the context data acquired from the one or more data sources includes an identification of a website accessed by the one or more portable electronic devices.

The embodiment of the program storage device, wherein the context data acquired from the one or more data sources includes one or more of a bandwidth consumed in association with the website, an amount of time spent using the website, and an action associated with the website.

The embodiment of the program storage device, wherein the action associated with the website includes browsing the website, making a post to the website, updating a status on the website, and sending a message through the website.

The embodiment of the program storage device, wherein the driving trip data or the context data acquired from the one or more data sources is in the form of a log, and wherein the log is accessed from one or more other portable electronic devices or one or more servers or one or more network elements comprising a wireless network.

The embodiment of the program storage device, wherein the driving trip data or the context data acquired from the one or more data sources is in the form of a call detail record, a message detail record, or an IP/Data detail record, and wherein the driving trip data or the context data comes directly from a network element, from an intermediary network element, a carrier billing system or a system capable of providing usage data of one or more electronic devices.

The embodiment of the program storage device, wherein the step of filtering includes filtering usage event data based on a user preference.

The embodiment of the program storage device, wherein the step of filtering includes filtering usage event data based on a relationship between the usage event data and one or more other usage events.

The embodiment of the program storage device, wherein the step of filtering includes filtering usage event data based on a relationship between the usage event data and risky driving behavior data associated with the one or more drivers.

An embodiment for a system for identifying when one or more drivers could be distracted by one or more portable electronic devices used by the one or more drivers while driving one or more vehicles, comprising: a data source ETL configured to receive driving trip data, usage data associated with the one or more portable electronic devices, and context data from one or more data sources; a database configured to store the driving trip data, the usage data, and the context data received from the data source ETL; and one or more processors configured to filter the driving trip data, the usage data and the context data in the database to determine one or more driving trips for the one or more drivers, to identify usage event data corresponding to the one or more driving trips, to determine one or more driving contexts for the one or more drivers, to create a set of distracted driving events occurring during the one or more driving trips, and to take one or more actions based on the set of distracted driving events.

The embodiment of the system, further comprising one or more displays configured to display at least a portion of the set of distracted driving events.

While the present disclosure illustrates and describes herein various embodiments, it is to be understood that the techniques described herein can have a multitude of additional uses and applications. Accordingly, the invention should not be limited to just the particular description and various drawing figures contained in this detailed description that merely illustrates particular embodiments and applications of the principles of the invention.

What is claimed is:

1. A non-transitory computer readable medium having instructions embodied thereon for creating a set of distracted driving events from one or more driving trips, the instructions comprising instructions that, in response to being executed by a computing device, cause the computing device to:
determine, based on driving trip data from one or more data sources, one or more driving trips for a plurality of drivers of one or more vehicles;
identify usage event data of one or more portable electronic devices, the usage event data corresponding to usage of the one or more portable electronic devices that occurred during the one or more driving trips;
determine, based on the one or more driving trips and context data acquired from the one or more data sources, one or more driving contexts for one or more drivers of the plurality of drivers;
filter the usage event data based on the driving context to create a set of distracted driving events for the one or more drivers that occurred during the one or more driving trips due to usage of the one or more portable electronic devices;
aggregate data from the set of distracted driving events for the one or more drivers to generate an aggregated set of distracted driving events for the plurality of drivers; and
take one or more actions based on the aggregated set of distracted driving events.

2. The non-transitory computer readable medium as recited in claim 1, wherein the usage event data includes one or more of a phone call placed, a phone call received, a phone call duration, a text message sent, a text message received, a text message response, an email sent, an email received, and an email response.

3. The non-transitory computer readable medium as recited in claim 1, wherein the usage event data includes a text message received, and wherein the instructions to filter comprise instructions that, in response to being executed by the computing device, cause the computing device to exclude the text message received from the set of distracted driving events.

4. The non-transitory computer readable medium as recited in claim 1, wherein the usage event data includes a text message received, a phone call placed and a text message sent, the text message received corresponding to a first phone number, and either the phone call placed or the text message sent corresponding to a second phone number, and wherein the instructions to filter comprise instructions that, in response to being executed by the computing device, cause the computing device to include the text message received in the set of distracted driving events if the first phone number matches the second phone number and if the text message sent was sent or the phone call placed was placed within a predetermined time period of the text message being received.

5. The non-transitory computer readable medium as recited in claim 1, wherein the usage event data includes a text message received, wherein the context data includes risky driving behavior data, and wherein the instructions to filter comprise instructions that, in response to being executed by the computing device, cause the computing device to include the text message received if the risky driving behavior data occurs within a predetermined time of the text message being received.

6. The non-transitory computer readable medium as recited in claim 1, wherein a location is determined based on telemetry data for the one or more vehicles from the one or more electronic data sources.

7. The non-transitory computer readable medium as recited in claim 1, wherein a location is determined based on telemetry data for the one or more portable electronic devices from the one or more electronic data sources.

8. The non-transitory computer readable medium as recited in claim 1, wherein a location is determined based on a time and a date for one or more usage events of the one or more portable electronic devices among the usage event data, an approximate speed of the one or more vehicles at the time of the one or more usage events, and environmental data associated with the one or more vehicles at the time of the one or more usage events.

9. The non-transitory computer readable medium as recited in claim 1, wherein the one or more data sources include one or more manually entered data sets comprising an indication of one or more of an operation, a location, or a movement of the one or more vehicles.

10. The non-transitory computer readable medium as recited in claim 1, wherein the instructions further comprise instructions that, in response to being executed by the computing device, cause the computing device to:
display the aggregated set of distracted driving events.

11. The non-transitory computer readable medium as recited in claim 1, wherein the instructions further comprise instructions that, in response to being executed by the computing device, cause the computing device to:
compare the set of distracted driving events for the one or more drivers to the aggregated set of distracted driving events to create a comparative set of distracted driving events; and
display the comparative set of distracted driving events.

12. The non-transitory computer readable medium as recited in claim 1, wherein the instructions further comprise instructions that, in response to being executed by the computing device, cause the computing device to send an alert to one or more recipients in response to one or more triggers associated with the set of distracted driving events.

13. The non-transitory computer readable medium as recited in claim 12, wherein the alert comprises one or more from the group consisting of an email, a text message, a voice message, a phone call and an instant message.

14. The non-transitory computer readable medium as recited in claim 1, wherein the instructions further comprise instructions that, in response to being executed by the computing device, cause the computing device to issue a message to the one or more drivers based on the set of distracted driving events.

15. The non-transitory computer readable medium as recited in claim 1, wherein the instructions further comprise instructions that, in response to being executed by the computing device, cause the computing device to reward the one or more drivers based on the set of distracted driving events.

16. The non-transitory computer readable medium as recited in claim 1, wherein the instructions further comprise instructions that, in response to being executed by the computing device, cause the computing device to:
identify a driver among the one or more drivers; and
identify a vehicle among the one or more vehicles driven by the driver during a driving trip.

17. The non-transitory computer readable medium as recited in claim 16, wherein the instructions that cause the computing device to identify the driver comprise instructions that, in response to being executed by the computing device, cause the computing device to identify the driver by at least a name, a portable electronic device, or an identification.

18. The non-transitory computer readable medium as recited in claim 1, wherein the instructions further comprise instructions that, in response to being executed by the computing device, cause the computing device to identify a set of portable device usage metrics from the usage event data for the one or more drivers during the one or more driving trips.

19. The non-transitory computer readable medium as recited in claim 18, wherein the set of portable device usage metrics include a percent of total time spent using the one or more portable electronic devices, a total number of usage events per the one or more driving trips, and a total number of usage events per a given time period or a given distance driven during the one or more driving trips.

20. The non-transitory computer readable medium as recited in claim 1, wherein the instructions that cause the computing device to filter comprise instructions that, in response to being executed by the computing device, cause the computing device to assign a risk factor and a score to one or more usage events among the usage event data.

21. The non-transitory computer readable medium as recited in claim 1, wherein data acquired from the one or more data sources includes an identification of an application or a service accessed by the one or more portable electronic devices.

22. The non-transitory computer readable medium as recited in claim 21, wherein the data acquired from the one or more data sources includes one or more of a bandwidth consumed in association with the application or the service, an amount of time spent using the application or the service, and an action associated with the application or the service.

23. The non-transitory computer readable medium as recited in claim 21, wherein the application or service accessed by the one or more portable electronic devices includes an application or service running on the portable electronic device and an application or service running in a remote network location.

24. The non-transitory computer readable medium as recited in claim 1, wherein the context data acquired from the one or more data sources includes an identification of a website accessed by the one or more portable electronic devices.

25. The non-transitory computer readable medium as recited in claim 24, wherein the context data acquired from the one or more data sources includes one or more of a bandwidth consumed in association with the website, an amount of time spent using the website, and an action associated with the website.

26. The non-transitory computer readable medium as recited in claim 1, wherein the instructions that cause the computing device to filter comprise instructions that, in response to being executed by the computing device, cause the computing device to filter the usage event data based on a user preference.

27. A system for identifying when one or more drivers could be distracted by one or more portable electronic devices used by the one or more drivers while driving one or more vehicles, the system comprising:
a database configured to store driving trip data, usage data associated with the one or more portable electronic devices, and context data; and
one or more computing devices configured to:
filter the driving trip data, the usage data, and the context data in the database to determine one or more driving trips for a plurality of drivers,
identify usage event data corresponding to usage of the one or more portable electronic devices that occurred during the one or more driving trips,
determine one or more driving contexts for the one or more drivers of the plurality of drivers,
create a set of distracted driving events for the one or more drivers that occurred during the one or more driving trips due to usage of the one or more portable electronic devices,
aggregate data from the set of distracted driving events for the one or more drivers to generate an aggregated data set of distracted driving events for the plurality of drivers, and
take one or more actions based on the aggregated set of distracted driving events.

28. The system as recited in claim 27, further comprising:
one or more displays configured to display at least a portion of the set of distracted driving events.

29. The system as recited in claim 28, wherein:
the one or more displays are further configured to display the aggregated set of distracted driving events.

30. The system as recited in claim 28, wherein:
the one or more computing devices are further configured to compare the set of distracted driving events for the one or more drivers to the aggregated set of distracted driving events to create a comparative set of distracted driving events, and the one or more displays are further configured to display the comparative set of distracted driving events.

31. The system as recited in claim 27, wherein the one or more actions include sending an alert to one or more recipients in response to one or more triggers associated with the set of distracted driving events.

32. The system as recited in claim 27, wherein the one or more actions include issuing a message to the one or more drivers based on the set of distracted driving events.

33. The system as recited in claim 27, wherein the one or more actions include identifying a set of portable device usage metrics from the usage event data for the one or more drivers during the one or more driving trips.

34. A method for creating a set of distracted driving events from one or more driving trips by a computing system comprising one or more computing devices, the method comprising:
    determining, by the computing system, based on driving trip data from one or more data sources, one or more driving trips for a plurality of drivers of one or more vehicles;
    identifying, by the computing system, usage event data of one or more portable electronic devices, the usage event data corresponding to usage of the one or more portable electronic devices that occurred during the one or more driving trips;
    determining, by the computing system, based on the one or more driving trips and context data acquired from the one or more data sources, one or more driving contexts for one or more drivers of the plurality of drivers;
    filtering, by the computing system, the usage event data based on the driving context to create a set of distracted driving events for the one or more drivers that occurred during the one or more driving trips due to usage of the one or more portable electronic devices;
    aggregating, by the computing system, data from the set of distracted driving events for the one or more drivers to generate an aggregated set of distracted driving events for the plurality of drivers; and
    taking, by the computing system, one or more actions based on the aggregated set of distracted driving events.

35. The method as recited in claim 34, further comprising:
    displaying, on a display, at least a portion of the set of distracted driving events.

36. The method as recited in claim 35, further comprising:
    displaying, on a display, the aggregated set of distracted driving events.

37. The method as recited in claim 35, further comprising:
    comparing the set of distracted driving events for a driver among the one or more drivers to the aggregated set of distracted driving events to create a comparative set of distracted driving events; and
    displaying the comparative set of distracted driving events.

38. The method as recited in claim 34, wherein taking the one or more actions comprises sending an alert to one or more recipients in response to one or more triggers associated with the set of distracted driving events.

39. The method as recited in claim 34, wherein taking the one or more actions comprises issuing a message to the one or more drivers based on the set of distracted driving events.

40. The method as recited in claim 34, wherein taking the one or more actions comprises identifying a set of portable device usage metrics from the usage event data for the one or more drivers during the one or more driving trips.

41. A system for creating a set of distracted driving events from one or more driving trips, the system comprising:
    means for determining, based on driving trip data from one or more data sources, one or more driving trips for a plurality of drivers of one or more vehicles;
    means for identifying usage event data of one or more portable electronic devices, the usage event data corresponding to usage of the one or more portable electronic devices that occurred during the one or more driving trips;
    means for determining, based on the one or more driving trips and context data acquired from the one or more data sources, one or more driving contexts for one or more drivers of the plurality of drivers;
    means for filtering the usage event data based on the driving context to create a set of distracted driving events for the one or more drivers that occurred during the one or more driving trips due to usage of the one or more portable electronic devices;
    means for aggregating data from the set of distracted driving events for the one or more drivers to generate an aggregated set of distracted driving events for the plurality of drivers; and
    means for taking one or more actions based on the aggregated set of distracted driving events.

42. The system as recited in claim 41, further comprising:
    means for displaying at least a portion of the set of distracted driving events.

43. The system as recited in claim 42, further comprising:
    means for displaying comprises means for displaying the aggregated set of distracted driving events.

44. The system as recited in claim 42, further comprising:
    means for comparing the set of distracted driving events for the one or more drivers to the aggregated set of distracted driving events to create a comparative set of distracted driving events,
    wherein the means for displaying comprises means for displaying the comparative set of distracted driving events.

45. The system as recited in claim 41, wherein the means for taking one or more actions comprises means for sending an alert to one or more recipients in response to one or more triggers associated with the set of distracted driving events.

46. The system as recited in claim 41, wherein the means for taking one or more actions comprises means for issuing a message to the one or more drivers based on the set of distracted driving events.

47. The system as recited in claim 41, wherein the means for taking one or more actions comprises means for identifying a set of portable device usage metrics from the usage event data for the one or more drivers during the one or more driving trips.

* * * * *